(12) United States Patent
Van et al.

(10) Patent No.: US 10,567,319 B2
(45) Date of Patent: *Feb. 18, 2020

(54) METHOD OF PROVIDING INSTANT MESSAGING SERVICE AND MULTIPLE SERVICES EXPANDED FROM INSTANT MESSAGING SERVICE

(71) Applicant: KAKAO CORP., Jeju-si, Jeju-do (KR)

(72) Inventors: Seung Hwan Van, Seoul (KR); Doo Shik Chung, Seoul (KR); Soo Wan Shin, Seoul (KR)

(73) Assignee: KAKAO CORP., Jeju-si, Jeju-Do (KR)

(*) Notice: Subject to any disclaimer, the term of this patent is extended or adjusted under 35 U.S.C. 154(b) by 254 days.

This patent is subject to a terminal disclaimer.

(21) Appl. No.: 15/497,949

(22) Filed: Apr. 26, 2017

(65) Prior Publication Data

US 2017/0230317 A1    Aug. 10, 2017

Related U.S. Application Data

(63) Continuation of application No. 13/877,874, filed as application No. PCT/KR2012/008110 on Oct. 8, 2012, now Pat. No. 9,647,967.

(30) Foreign Application Priority Data

Nov. 8, 2011   (KR) .................. 10-2011-0115749
Aug. 20, 2012  (KR) .................. 10-2012-0090569

(51) Int. Cl.
*H04L 12/58*   (2006.01)
*G06Q 10/10*   (2012.01)
(Continued)

(52) U.S. Cl.
CPC ......... *H04L 51/046* (2013.01); *G06Q 10/107* (2013.01); *H04L 51/04* (2013.01);
(Continued)

(58) Field of Classification Search
CPC ..... H04L 12/581; H04L 51/046; H04L 51/04; G06Q 10/10; G06Q 10/107
See application file for complete search history.

(56) References Cited

U.S. PATENT DOCUMENTS

7,828,661 B1   11/2010  Fish et al.
8,015,246 B1   9/2011   Anderson
(Continued)

FOREIGN PATENT DOCUMENTS

EP    1 475 939 A1     11/2004
JP    H09-167072 A     6/1997
(Continued)

OTHER PUBLICATIONS

Derby x Derby Derby Derby, App Style, vol. 4, p. 100, Sep. 1, 2011. (with abstract).
(Continued)

*Primary Examiner* — Mahelet Shiberou
(74) *Attorney, Agent, or Firm* — Gilberto M. Villacorta; Jihwang Yeo; Foley & Lardner LLP

(57) ABSTRACT

Provided is a method of providing an instant messaging service and multiple services expanded from the instant messaging service, the method including displaying a chat window for a chat room related to an instant messaging service, receiving a touch event input by a user on the chat window, selecting one service among a plurality of services expanded from the instant messaging service in response to the touch event, and displaying a window related to the selected service.

15 Claims, 19 Drawing Sheets

(51) Int. Cl.
*H04W 4/20* (2018.01)
*H04L 29/08* (2006.01)

(52) U.S. Cl.
CPC ............ *H04L 51/38* (2013.01); *H04L 67/306* (2013.01); *H04W 4/203* (2013.01)

(56) References Cited

U.S. PATENT DOCUMENTS

| | | |
|---|---|---|
| 8,751,572 B1 | 6/2014 | Behforooz et al. |
| 2002/0086732 A1 | 7/2002 | Kirmse et al. |
| 2005/0054324 A1 | 3/2005 | Chmaytelli et al. |
| 2005/0086309 A1 | 4/2005 | Galli et al. |
| 2008/0104173 A1 | 5/2008 | Wilcox et al. |
| 2008/0163090 A1 | 7/2008 | Cortright |
| 2008/0201434 A1 | 8/2008 | Holmes et al. |
| 2008/0215978 A1 | 9/2008 | Bamba |
| 2008/0288467 A1 | 11/2008 | Szeto et al. |
| 2009/0181767 A1 | 7/2009 | Feng |
| 2010/0056189 A1 | 3/2010 | Park et al. |
| 2011/0055735 A1* | 3/2011 | Wood .................. G06Q 10/107 715/758 |
| 2011/0087749 A1 | 4/2011 | Swink et al. |
| 2011/0191770 A1* | 8/2011 | Inoue ..................... G06F 9/445 717/178 |
| 2011/0258271 A1 | 10/2011 | Gaquin |
| 2012/0072856 A1 | 3/2012 | Park et al. |
| 2012/0124485 A1 | 5/2012 | Scherpa et al. |
| 2012/0311472 A1 | 12/2012 | Kim |

FOREIGN PATENT DOCUMENTS

| | | |
|---|---|---|
| JP | 2002-245084 A | 8/2002 |
| JP | 2005-173873 A | 6/2005 |
| JP | 2006-293475 | 10/2006 |
| JP | 2007-505561 | 3/2007 |
| JP | 2008-527856 A | 7/2008 |
| JP | 2008-217338 | 9/2008 |
| JP | 2009-148580 | 7/2009 |
| JP | 2010-533906 A | 10/2010 |
| JP | 2013-524878 | 6/2013 |
| JP | 2013-530590 | 7/2013 |
| KR | 10-2001-0100280 A | 11/2001 |
| KR | 10-2002-0039909 A | 5/2002 |
| KR | 10-2010-0004754 A | 1/2010 |
| KR | 10-2010-0027708 A | 3/2010 |
| KR | 10-2010-0038858 A | 4/2010 |
| RU | 2007141932 A | 5/2009 |
| WO | WO-2011/126508 | 10/2011 |

OTHER PUBLICATIONS

Extended European Search Report dated May 20, 2015 in related European Appl. No. 12848587.7 (12 pgs.).
International Search Report dated Mar. 28, 2013 in PCT/KR2012/008110.
Internet Samurai thoroughly evaluates new services Sorry to Hack Yahoo!!, vol. 7, No. 4, pp. 142-149, Internet Learner, Softbank Publishing Inc., Japan, Apr. 1, 2005.
Office Action issued in corresponding Japanese application No. 2015-080361 dated Mar. 28, 2016.
Office Action dated Apr. 25, 2016 in related Russian application No. 2014122032 (4 pgs.).
Office Action dated Dec. 9, 2014 in Japan Application No. 2013-543120.
Office Action dated Jul. 29, 2014 in Korean Application No. 10-2012-0090569.
Office Action dated May 20, 2014 in Japan Application No. 2013-543120.
Office Action dated Oct. 28, 2015 in Russian Application No. 2014-122032.
Takashi, Maruyama, "A current state of social App related to smart phone,", I/O vol. 36, No. 7, pp. 68-69, Jul. 1, 2011. (with abstract).
Office Action dated Dec. 18, 2015 in related U.S. Appl. No. 13/877,874.
Office Action dated Jul. 6, 2015 in related U.S. Appl. No. 13/877,874.
Office Action dated Jun. 13, 2016 in related U.S. Appl. No. 13/877,874.

* cited by examiner

METHOD OF PROVIDING INSTANT MESSAGING SERVICE AND MULTIPLE SERVICES EXPANDED FROM INSTANT MESSAGING SERVICE

CROSS REFERENCE TO RELATED APPLICATIONS

This application is a continuation of U.S. patent application Ser. No. 13/877,874 filed Apr. 4, 2013 which issued as U.S. Pat. No. 9,647,967 on May 9, 2017, which is a PCT National Phase Application of PCT/KR2012/008110 Filed Oct. 8, 2012, which claims priority to Korean Application Nos. 10-2012-0090569 filed Aug. 20, 2012 and 10-2011-0115749 filed Nov. 8, 2011, all of which are incorporated by reference herein in their entirety.

TECHNICAL FIELD

Exemplary embodiments relate to a method of providing an instant messaging service and multiple services additionally provided by the instant messaging service.

BACKGROUND ART

With a recent rise in distribution of mobile terminals, mobile terminals are now considered an essential item for modern life. Since, in addition to a voice call service unique to each portable terminal, a variety of data transmission services and various additional services are being made available via mobile terminals, mobile terminals are being transformed into functional multimedia communication devices.

Also, with developments in communication technology, a mobile terminal enables a function of a messenger program previously only available on a conventional personal computer (PC). Accordingly, there is a demand for a method of chatting conveniently through accessing a mobile message server.

As a number of instant messaging service users is increasing, a demand for a method of providing various services using information associated with a chat message transmitted and received between instant messaging service users exists.

DISCLOSURE OF INVENTION

Technical Goals

An aspect of the present invention provides a desired service to a user by identifying a plurality of services expandable from a chat room to which a user belongs, based on information associated with the chat room, and by selecting one service among the plurality of services.

Another aspect of the present invention enables expansion of a personal relationship formed by the chat room to which the user belongs to the plurality of services, by transmitting the information associated with the chat room to a server providing the selected service or an application corresponding to the selected service.

Still another aspect of the present invention provides the user with various services based on a type of a window, by selecting one service among the plurality of services based on a type of a window selected by the user, and by providing information corresponding to the selected window to the server for the selected service or the application corresponding to the selected service.

Technical Solutions

According to an aspect of the present invention, there is provided a method of providing an instant messaging service and multiple services expanded from the instant messaging service, the method including displaying a chat window for a chat room related to an instant messaging service, receiving a touch event input by a user on the chat window, selecting one service among a plurality of services in response to the touch event, and displaying a window related to the selected service.

The method may further include providing information associated with the chat room to a server for the selected service using a network module.

The method may further include allowing an application corresponding to the selected service to access the information associated with the chat room.

The method may further include inviting another user to the selected service through the chat room, through the application corresponding to the selected service being executed.

The method may further include transmitting an invitation to the selected service to the other user through the chat room based on whether the application is installed in a terminal of the user, and updating the chat window using the transmitted invitation.

The method may further include issuing a token for allowing the other user to access the selected service when the application is installed in the terminal of the user.

The method may further include counting a number of accesses or a period of time related to the user accessing the selected service, or a number of downloads related to the user downloading the application corresponding to the selected service.

The method may further include arranging icons of applications corresponding to the plurality of services in response to the touch event by the user.

The method may further include receiving the invitation to the selected service from the other user through the chat room. The invitation to the selected service may include an identifier for instructing the application corresponding to the selected service to be executed and an identifier for instructing the application corresponding to the selected service to be downloaded.

The method may further include determining whether the application is installed in the terminal of the user, and downloading the application using the identifier for instructing the application corresponding to the selected service to be downloaded when the application is absent in the terminal of the user.

The method may further include identifying the plurality of services corresponding to the chat room.

The identifying of the plurality of services may include identifying the plurality of services corresponding to the chat room based on the information associated with the chat room.

The identifying of the plurality of services corresponding to the chat room may include recognizing a number of users joining the chat room from the information associated with the chat room, and identifying the plurality of services corresponding to the chat room based on the recognized number of the users.

The selecting of one service may further include referring to information associated with an order of providing of the plurality of services preset for selecting one service.

The information associated with the chat room may include at least one of account-related information including an identification (ID), a telephone number, and an e-mail address, a gender, an age, a job, and an address, for each user registered in the chat room.

According to another aspect of the present invention, there is provided a method of providing an instant messaging service and multiple services expanded from the instant messaging service, the method including displaying a chat window for a chat room related to an instant messaging service, receiving a touch event input by a user on the chat window, acquiring information associated with the chat room, selecting one service among a plurality of services in response to the touch event, providing the information associated with the chat room to a server for the selected service, and displaying a window related to the selected service being provided by the server.

According to still another aspect of the present invention, there is provided a method of providing an instant messaging service and multiple services expanded from the instant messaging service, the method including displaying one window among different types of windows related to an instant messaging service, receiving a touch event input by a user on the one window, identifying a type of the one window, selecting one service among a plurality of services based on the type of the one window, and displaying a window related to the selected service.

The method may further include providing information corresponding to the one window to a server for the selected service, or allowing an application corresponding to the selected service to access the information corresponding to the one window.

The displaying of the window related to the selected service may include displaying the window related to the selected service being provided by the server for the selected service or an application corresponding to the selected service.

The different types of windows may include at least one of a profile window providing profile information of the user, a chat window enabling the user to use the instant messaging service, and a home screen providing the plurality of services expanded from the instant messaging service.

The selecting of one service among the plurality of services based on the type of the one window may include selecting one service among a service set corresponding to the type of the one window, based on the type of the one window.

The service set may include at least one of a first service set including a photo service, a memo service, a clipping service, and a wall paper service for the information corresponding to the one window, a second service set including a photo providing service, a file providing service, a schedule providing service, and a match game providing service associated with a chat room to which the user belongs, and a third service set including a news providing service, a shopping information providing service, a game providing service, a recruit service, and a contents providing service, provided by a home server or the server for the selected service.

EFFECTS OF THE INVENTION

According to an exemplary embodiment, a personal relationship formed by a chat room to which a user belongs may be expanded to a plurality of various services by transmitting information associated with the chat room to a server providing a selected service.

According to an exemplary embodiment, an optimum service may be provided to users joining the chat room by identifying the plurality of services expandable from the chat room based on the information associated with the chat room, and by selecting one service among the plurality of services.

According to an exemplary embodiment, various services may be provided to the user based on a type of a window by selecting one service among the plurality of services based on a type of a window selected by the user, and by providing information corresponding to the selected window to the server for the selected service or an application corresponding to the selected service.

BEST MODE FOR CARRYING OUT THE INVENTION

Figure 1:
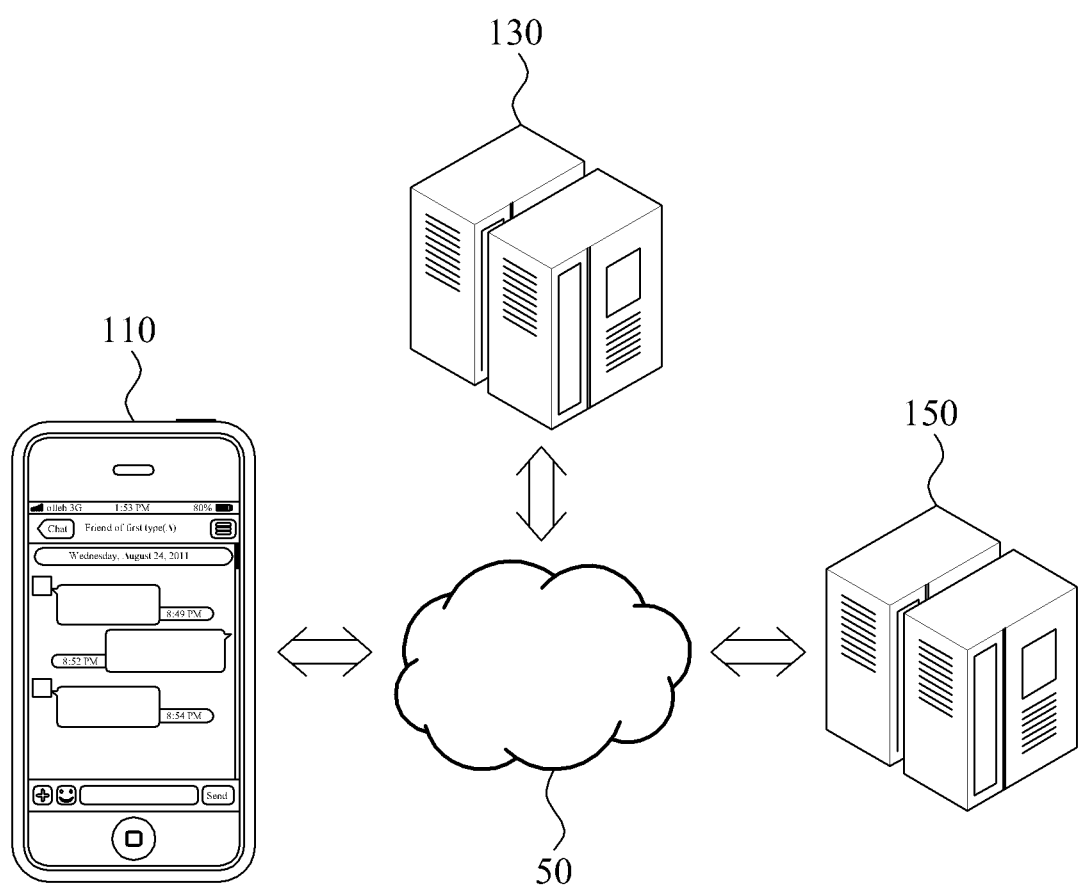
FIG. 1 is a diagram illustrating a network structure of a system for implementing a method of providing an instant messaging service and multiple services expanded from the instant messaging service according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a network structure of a system for implementing a method of providing an instant messaging service and multiple services supplemented by the instant messaging service according to an exemplary embodiment of the present invention. The system may include a mobile terminal 110, a management server 130, and a third server 150.

The mobile terminal 110 may download an application for an instant messaging service provided by the management server 130 via a network 50, for example, the application may be installed in the mobile terminal 110 through a wireless Internet connection or a wireless communication network.

The mobile terminal 110 may be provided with the instant messaging service and multiple services supplemented by the instant messaging service provided by the management server 130 and the third server 150.

In this instance, the multiple services supplemented by the instant messaging service may be provided by the management server 130 or the third server 150.

The third server 150 may provide the multiple services expanded from the instant messaging service provided by the management server 130, the multiple services being different from the instant messaging service. The multiple services may include, for example, a game service, a photo service, a music service, a message board service, a file sharing service, and the like.

The management server 130 may enable the third server 150 to provide multiple services to the mobile terminal 110, by acquiring information associated with a chat window to which a user of the mobile terminal 110 belongs, or information corresponding to one window among different types of windows related to the instant messaging service, and by providing the acquired information to the third server 150 or sharing the acquired information with the third server 150. Also, the management server 130 and the third server 150 may share a service result provided to the user of the mobile terminal 110 by the third server 150.

The instant messaging service described hereinafter may include a real-time chat service enabling a real-time chat by transmitting a memo, a text message, a file, a material, and the like, via a network, for example, a wireless Internet connection or a wireless communication network in real time, and related services.

Figure 2:
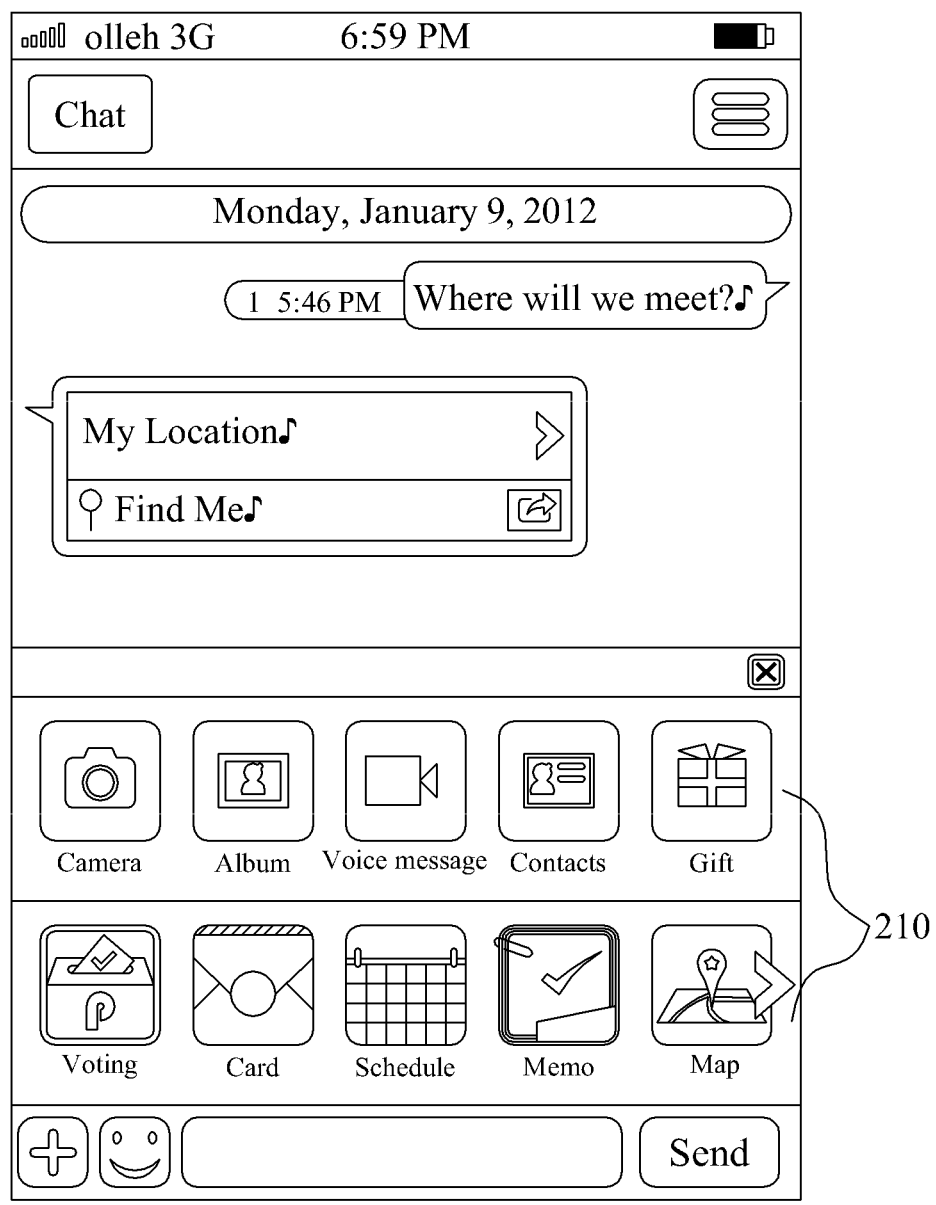
FIG. 2 is a conceptual diagram illustrating providing of multiple services expanded from an instant messaging service being run in a mobile terminal of FIG. 1.

FIG. 2 is a conceptual diagram illustrating providing of multiple services expanded from an instant messaging service being run in the mobile terminal of FIG. 1.

Referring to FIG. 2, the method of providing an instant messaging service and multiple services expanded from the instant messaging service according to an exemplary embodiment of the present invention may provide multiple services expanded from an instant messaging service while maintaining a relationship with users gathered in a chat room related to the instant messaging service. For example, various services 210 may be supported and accepted in a chat window for the chat room.

According to the method of providing multiple services expanded from an instant messaging service according to an exemplary embodiment of the present invention, while a user is chatting through an instant messaging service, the user may generate an object by calling another service or an application corresponding to another service, and may transmit the generated object using a chat message. The transmitting of the object generated by calling another service using the chat message may correspond to an operation for sharing a product of an external application in the chat room.

While the user is chatting through the instant messaging service, the user may also invite another user to a space for another service different from the instant messaging service, for example, a game service space or a game application space.

The user may invite another user to an application space outside the chat room being used by the user through the chat room in a state in which the user is staying in the application space outside the chat room.

An exemplary embodiment in which the user invites another user in the chat room to another application space being used by the user is described in further detail with reference to FIGS. 7 and 8.

Figure 3:
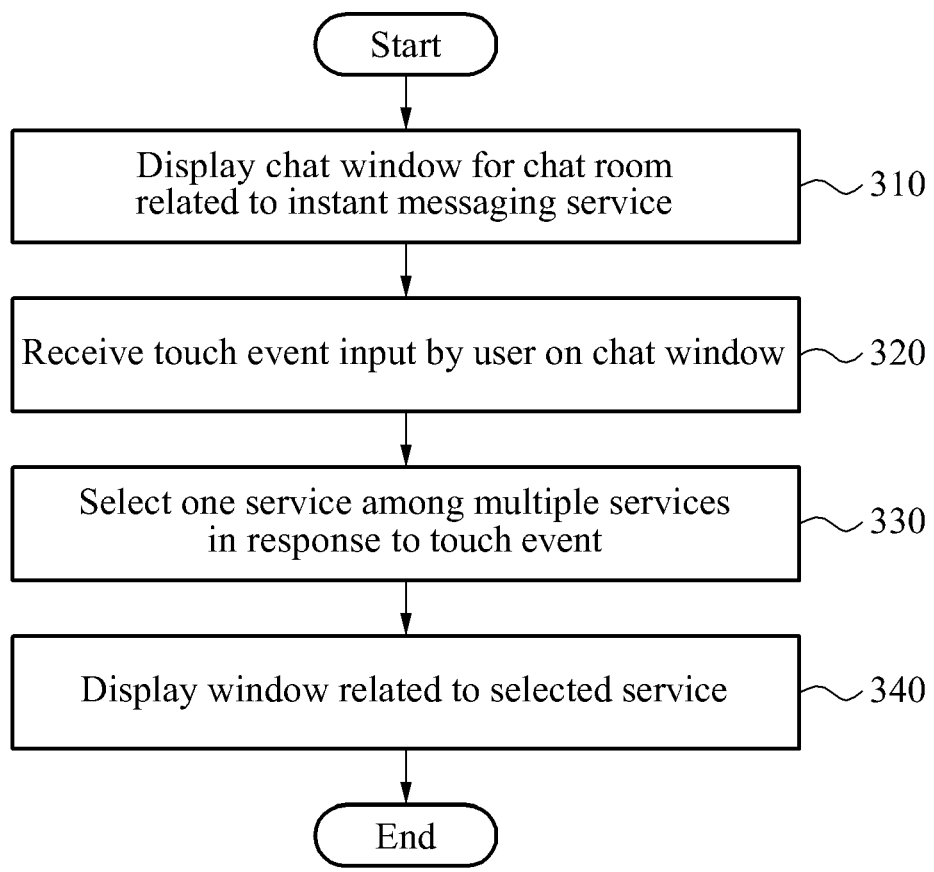
FIG. 3 is a flowchart illustrating a method of providing an instant messaging service and multiple services expanded from the instant messaging service according to an exemplary embodiment of the present invention.

FIG. 3 is a flowchart illustrating a method of providing an instant messaging service and multiple services expanded from the instant messaging service according to an exemplary embodiment of the present invention.

Referring to FIG. 3, an apparatus for providing an instant messaging service and multiple services expanded from the instant messaging service according to an exemplary embodiment of the present invention, hereinafter referred to as a providing apparatus, may display a chat window for a chat room related to the instant messaging service, in operation 310. The chat room related to the instant messaging service may include at least one of a one-to-one chat room, a group chat room, and a meeting chat room.

In operation 320, the providing apparatus may receive a touch event input by a user on the chat window. The touch event may include touching, paging, and flicking a touch display of the chat window.

In operation 330, the providing apparatus may select one service among a plurality of services in response to the touch event. In this instance, the providing apparatus may refer to information associated with an order of providing of the plurality of services set for selecting one service. For example, a game service may be provided first and an album service may be provided last based on user settings or default settings. The order of providing services may be set differently for each chat room.

For example, the information associated with the order of providing the plurality of services may include information pre-stored in a memory in a form of a table, and preference information obtained based on a frequency of the user making use of the plurality of services. The providing apparatus may select one service to be provided that corresponds to the chat room among the plurality of services based on the information associated with the chat room.

In operation 340, the providing apparatus may display a window related to the selected service.

In advance of performing operation 330, the providing apparatus may acquire information associated with the chat room, and may provide the acquired information to a server for the selected service or an application corresponding to the selected service. An exemplary embodiment in which the providing apparatus provides the information associated with the chat room to the server for the selected service is described in further detail with reference to FIG. 4.

Figure 4:
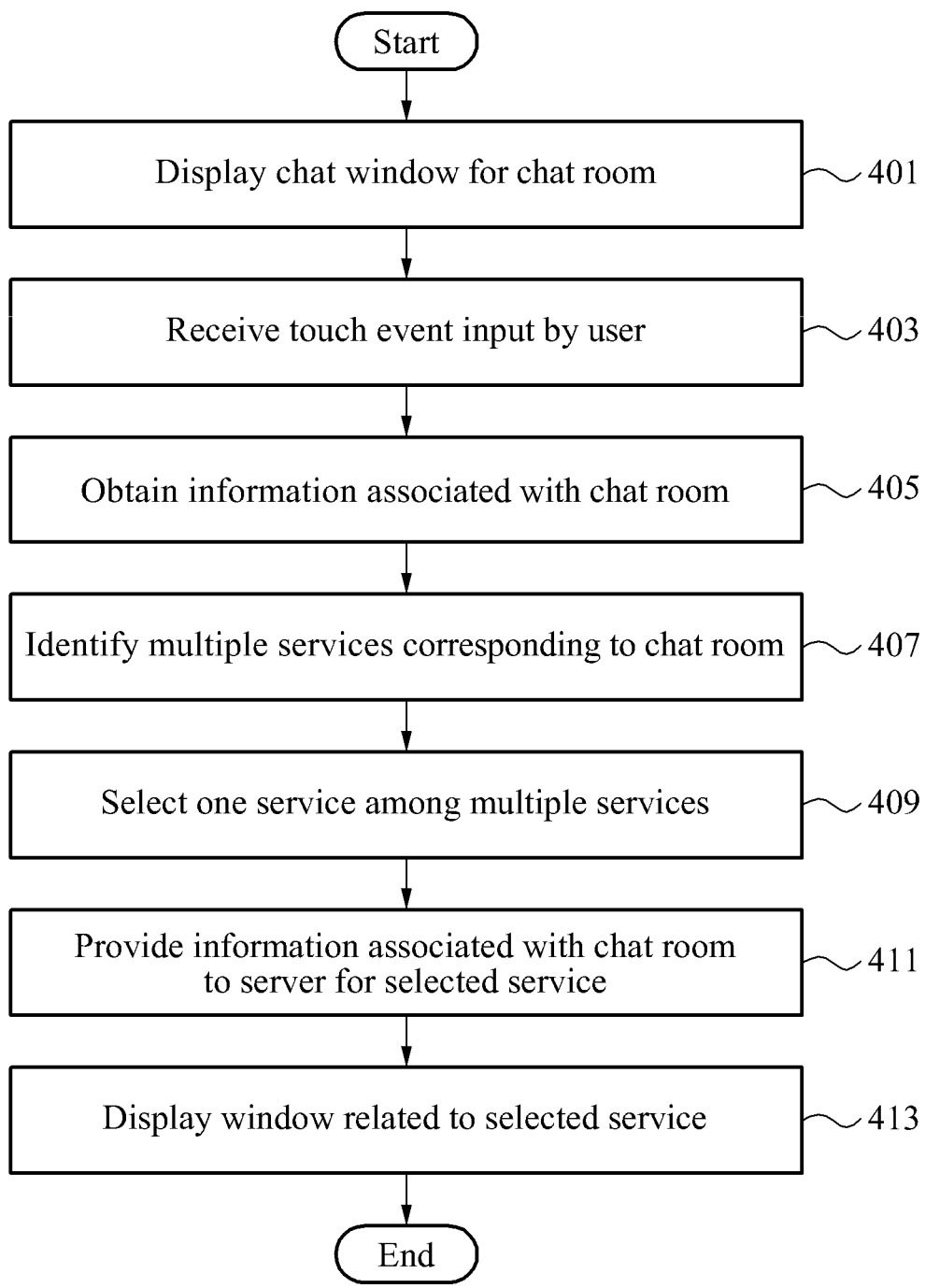
FIG. 4 is a flowchart illustrating a method of providing an instant messaging service and multiple services expanded from the instant messaging service according to another exemplary embodiment of the present invention.

FIG. 4 is a flow chart illustrating a method of providing an instant messaging service and multiple services expanded from the instant messaging service according to another exemplary embodiment of the present invention.

Referring to FIG. 4, an apparatus for providing an instant messaging service and multiple services expanded from the instant messaging service according to another exemplary embodiment of the present invention, for example, a providing apparatus as a mobile terminal, may display a chat window for a chat room related to an instant messaging service, in operation 401. The chat room related to the instant messaging service may include at least one of a one-to-one chat room, a group chat room, and a meeting chat room.

In operation 403, the providing apparatus may receive a touch event input by a user on the chat window. The touch event may include touching, paging, and flicking a touch display of the chat window.

In operation 405, the providing apparatus may acquire information associated with the chat room. The information associated with the chat room may include at least one of account-related information including an identification (ID), a telephone number and an e-mail address, a gender, an age, a job, and an address, for each user registered in the chat room. The providing apparatus may provide the acquired account-related information of each user registered in the chat room to a server for a selected service, for example, a third server. In this instance, the providing apparatus may provide the corresponding information to the server for the selected service, irrespective of whether the corresponding user is participating in the instant messaging service.

Although the corresponding user is a non-subscriber or a non-registered user of, for example, a game service provided by the third server, the corresponding user may be provided with the game service directly, absent a need for a process of creating a separate account.

In operation 407, the providing apparatus may identify a plurality of services corresponding to the chat room. The providing apparatus may identify the plurality of services corresponding to the chat room based on the information associated with the chat room. The providing apparatus may recognize a number of users currently occupying the chat room, based on the information associated with the chat room. The providing apparatus may identify services executable by the users currently occupying the chat room to be the services corresponding to the chat room, based on the number of users recognized.

In operation 409, the providing apparatus may select one service among the plurality of services in response to the touch event. In this instance, the providing apparatus may refer to information associated with an order of providing of the plurality of services set for selecting one service.

For example, the information associated with the order of providing of the plurality of services may include information pre-stored in a memory in a form of a table, and preference information obtained based on how often the user uses the plurality of services. The providing apparatus may select one service to be provided that corresponds to the chat room among the plurality of services based on the information associated with the chat room.

The providing apparatus may count a number of accesses of the user accessing the selected service among the plurality of services, and may provide the server for the selected service with the counted number of accesses. In this instance, the providing apparatus may share profits for the selected service with the server based on the counted number of accesses. In addition to the number of accesses, a period of time of access and a number of application downloads may be counted.

In operation 411, the providing apparatus may provide the information associated with the chat room to the server for the selected service. When the selected service corresponds to a service provided by the management server 130, for example, an instant messaging service, the providing apparatus may provide the information associated with the chat room to the management server 130. When the selected service corresponds to a service provided by the third server 150, the providing apparatus may provide the information associated with the chat room to the third server 150.

In operation 413, the providing apparatus may display a window related to the selected service being provided by the server for the selected service. The providing apparatus may correspond to the management server 130 of FIG. 1.

According to exemplary embodiments, the providing apparatus may provide the information associated with the chat room to an application corresponding to the selected service instead of the server for the selected service, and may display a window related to the selected service being provided by the corresponding application.

Figure 5:
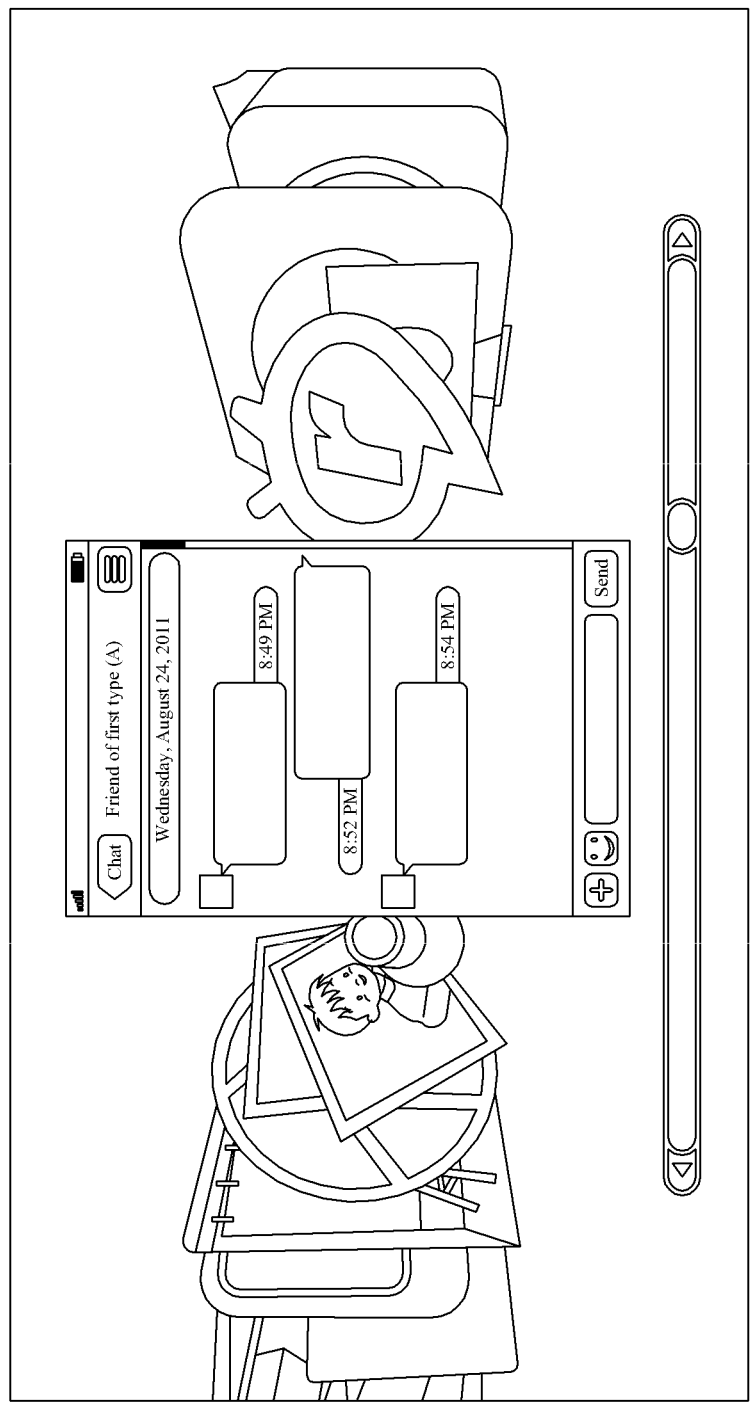
FIG. 5 is a conceptual diagram illustrating a method of providing an instant messaging service and multiple services expanded from the instant messaging service according to an exemplary embodiment of the present invention.

FIG. 5 is a conceptual diagram illustrating a method of providing an instant messaging service and multiple services expanded from the instant messaging service according to an exemplary embodiment of the present invention.

Referring to FIG. 5, the method of providing an instant messaging service and multiple services expanded from the instant messaging service according to an exemplary embodiment of the present invention may provide a user with tertiary services differing from an instant messaging service, for example, a game service, a photo service, a music service, a file sharing service, and the like, in response to a touch event input by the user on a chat window. The management server 130 providing the instant messaging service and the third server 150 may share information associated with the user and a result of the third service provided to the user. For example, a result of a game service provided through the third server 150 may be provided to the management server 130 providing the instant messaging service and may be displayed on the chat window, and users transmitting and receiving an instant message through the chat window may play a match game.

The management server 130 may provide the third server 150 with information associated with the chat room to provide multiple services expanded from the instant messaging service to the user. The information associated with the chat room may include at least one of account-related information including an ID, a telephone number, and an e-mail address, a gender, an age, a job, and an address, for each user registered in the chat room.

Accordingly, the users registered in the chat room may be provided with various services provided by the third server 150 directly, absent a need for account registration and authentication. A detailed description of various services provided to the user by the management server 130 and the third server 150 is provided with reference to FIG. 6.

Figure 6:
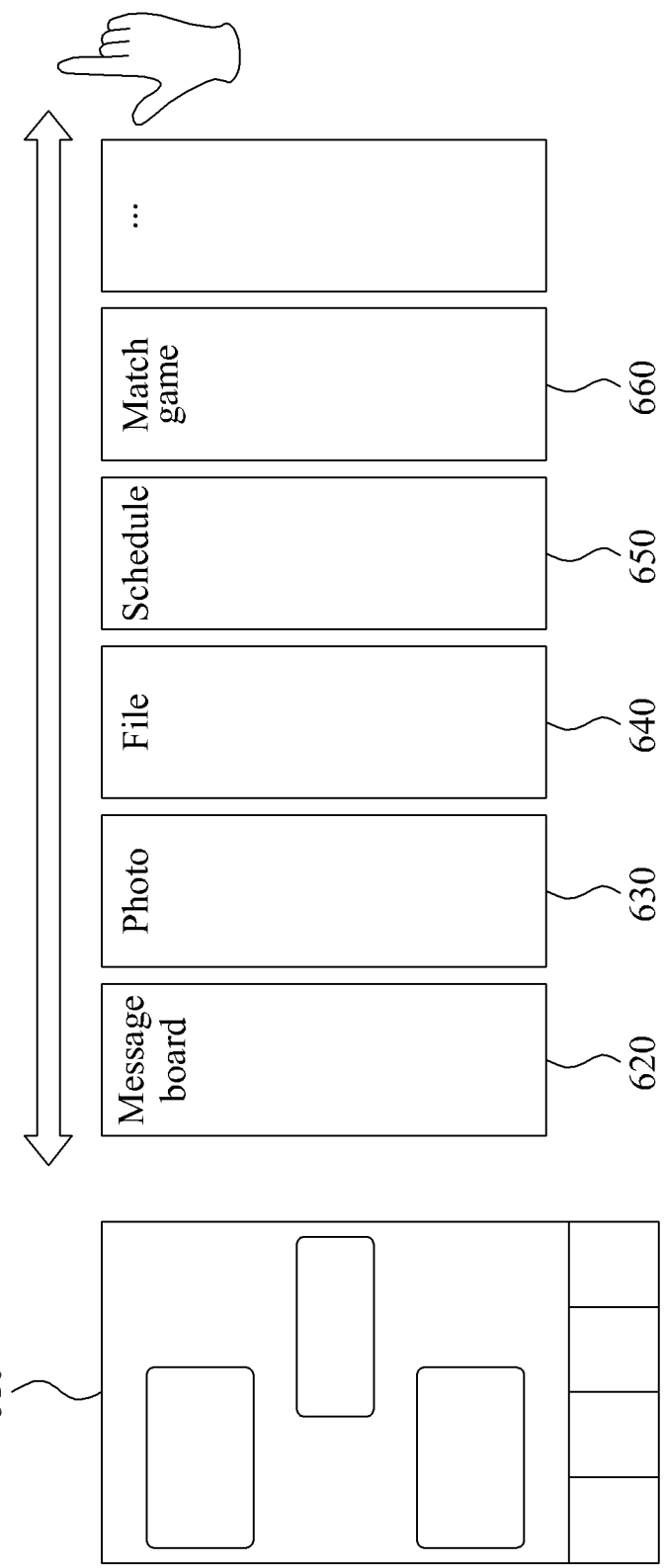
FIG. 6 is a diagram illustrating multiple services expanded from a chat window for a chat room related to an instant messaging service according to an exemplary embodiment of the present invention.

FIG. 6 is a diagram illustrating multiple services expanded from a chat window for a chat room related to an instant messaging service according to an exemplary embodiment of the present invention.

Referring to FIG. 6, when the chat window for the chat room related to the instant messaging service is displayed and a touch event input by a user on the chat window is received, a providing apparatus may select one service among a plurality of services in response to the touch event.

In this instance, the plurality of services that may be selected by the providing apparatus may correspond to a corresponding chat room. For example, when a user X is registered in both a chat room A and a chat room B, a plurality of services corresponding to the chat room A may differ from a plurality of services corresponding to the chat room B. Accordingly, the providing apparatus may identify the plurality of services provided that correspond to the chat room A, based on information associated with the chat room A, may select one service among the plurality of services, and may provide the selected service to the user.

When the providing apparatus selects one service among the plurality of services, the providing apparatus may refer to an order of providing of the plurality of services pre-stored in a form of a table, or the providing apparatus may select a service to be provided that corresponds to the chat room among the plurality of services based on a number of users currently occupying the chat room.

When a chat window 610 being accessed by the user X is related to the chat room A, the providing apparatus may provide the user X with a message board service 620 for the chat room A and a photo service 630 and a file sharing service 640 for photos and files uploaded by users registered in the chat room A. Also, the providing apparatus may provide the user X with a schedule service 650 for the chat room A, and a match game service 660 for users registered in the chat room A.

For example, when four users are provided with the instant messaging service in the chat room A, the providing apparatus may recognize account information of the four users based on information associated with the chat room A, and may allow the corresponding users to play a match game.

In this instance, the plurality of services may be switched in response to the touch event input by the user, for example, paging or flicking. Alternatively, the plurality of services may be switched by the providing apparatus providing notification of an available service to induce the user to select the corresponding service. The user may invite another user registered in the chat room to an application space in which the user is staying, to play a match game together.

The plurality of services provided to the user X may be provided to users registered in the chat room by the providing apparatus alone, or through an external third server or an application corresponding to the service selected by the user.

Figure 7:
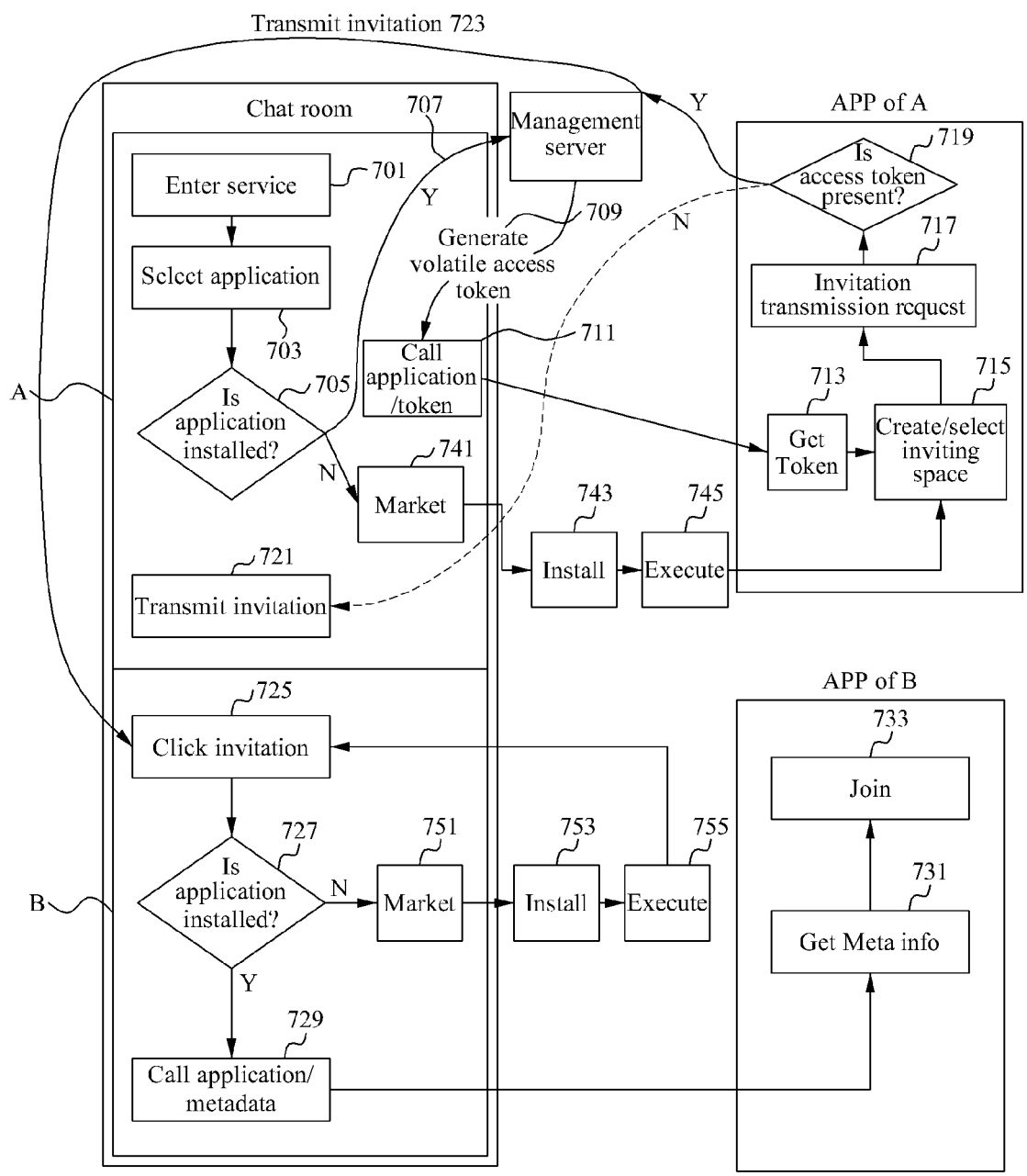
FIG. 7 is a diagram illustrating a method of enabling a user outside a chat room to invite another user through the chat room according to a method of providing an instant messaging service and multiple services expanded from the instant messaging service according to an exemplary embodiment of the present invention.

FIG. 7 is a diagram illustrating a method of enabling a user outside a chat room to invite another user through the chat room according to a method of providing an instant messaging service and multiple services expanded from the instant messaging service according to an exemplary embodiment of the present invention.

In the exemplary embodiments, a user X and a user Y may correspond to users registered in a same chat room Z, and the user X may invite the user Y to an external space in which the user X is staying, for example, a game application space.

For the chat room Z, a chat window A may be displayed on a terminal of the user X and a chat window B may be displayed on a terminal of the user Y.

Referring to FIG. 7, in operation 701, the user X may enter a service window providing an instant messaging service and a plurality of services expanded from the instant messaging service. In operation 703, the user X may select an application corresponding to a selected service, for example, a game application, by selecting one service among the plurality of services expanded from the instant messaging service through the chat window A.

In operation 705, the providing apparatus may determine whether the selected game application is installed in the terminal of the user X.

In operation 707, when the game application is determined to be installed in the terminal of the user X in operation 705, the providing apparatus may request a management server to issue a volatile access token. A type of access to the game application may correspond to a type in which the user X may invite the user Y to a space in which the user X is staying.

The providing apparatus may request the management server to issue the access token to transmit an invitation to the user Y belonging to the chat room Z in a state in which the user X stays in the external application space. The external application space may correspond to a space in which the game application corresponding to the service selected by the user X in operation 703 may be executed, and the chat room Z may correspond to a chat room related to the instant messaging service.

The game application corresponding to the selected service may be provided through a window related to the selected service, and the window related to the selected service may differ from the chat window A.

In operation 709, the management server may issue the volatile access token or an access key, and may provide the volatile access token or the access key to the user X. The volatile access token or the access key may correspond to a token allowing access to a predetermined application, for example, the game application, to transmit a message to a predetermined chat room, for example, the chat room Z, once.

In operation 711, the user X may call the game application using the access token.

In operation 713, the called game application may receive the token, and in operation 715, may create a space for inviting the user Y to the game application or select a predetermined space for the user Y.

When the space for the user Y is provided in operation 715, the game application may transmit an invitation transmission request to the user Y in operation 717. In operation 719, the game application may determine whether the access token issued in operation 707 is present.

When the access token is determined to be present in operation 719, the game application may transmit the invitation transmission request to the management server with the token in operation 721. The management server may inspect the token, and when irregularities are absent, may transmit the invitation, for example, an invitation message, to the chat window B for the chat room Z in which the user Y belongs in operation 723.

When the access token is determined to be absent in operation 719, the application may transmit the invitation, for example, an invitation message, to the user Y through the chat room Z in operation 721. The chat window may be updated using the invitation.

When the selected application is determined to be absent in the terminal of the user X in operation 705, the providing apparatus may fail to request the management server to issue the token and may move to a Market in operation 741. Since the access token provided from the management server fails to be transmitted to the corresponding application, the providing apparatus may move to the Market directly, absent requesting issuance of the token.

Here, the Market may include a window provided to install the selected application, a window provided to install applications corresponding to the plurality of services expanded from the instant messaging service, and a space enabling selection of an application corresponding to a service through the touch event input on the display.

In operation 743, the providing apparatus may install an application selected through the Market, and in operation 745, may execute the application to create a space for inviting the user Y in the same manner as operation 715.

In operation 725, when the user Y receives the invitation from the user X through the chat window B, the user Y may click the received invitation.

In operation 727, the providing apparatus may determine whether the application corresponding to the invited space through the invitation, in this case, the game application, is installed in the terminal of the user Y. When the application corresponding to the invited space, in this case, the game application is installed in the terminal of the user Y, the providing apparatus may call the game application in operation 729. In this instance, a rule on transmission of metadata to the game application may be pre-defined.

In this instance, the providing apparatus may provide information associated with the chat room Z when the game application is installed in the terminal of the user Y. When the user Y moves to the application space, the application may obtain metadata such as the information associated with the chat room Z, and may allow the user Y to join the corresponding application space, that is, the game application space, using the metadata.

When the application corresponding to the invited space, for example, the game application is determined to be absent in the terminal of the user Y in operation 727, the user Y may move to the Market in operation 751, and may select or install a game application and may execute the game application in operation 755.

The user Y may return to the chat room Z, and may click the invitation again through the chat window B in operation 725.

Figure 8:
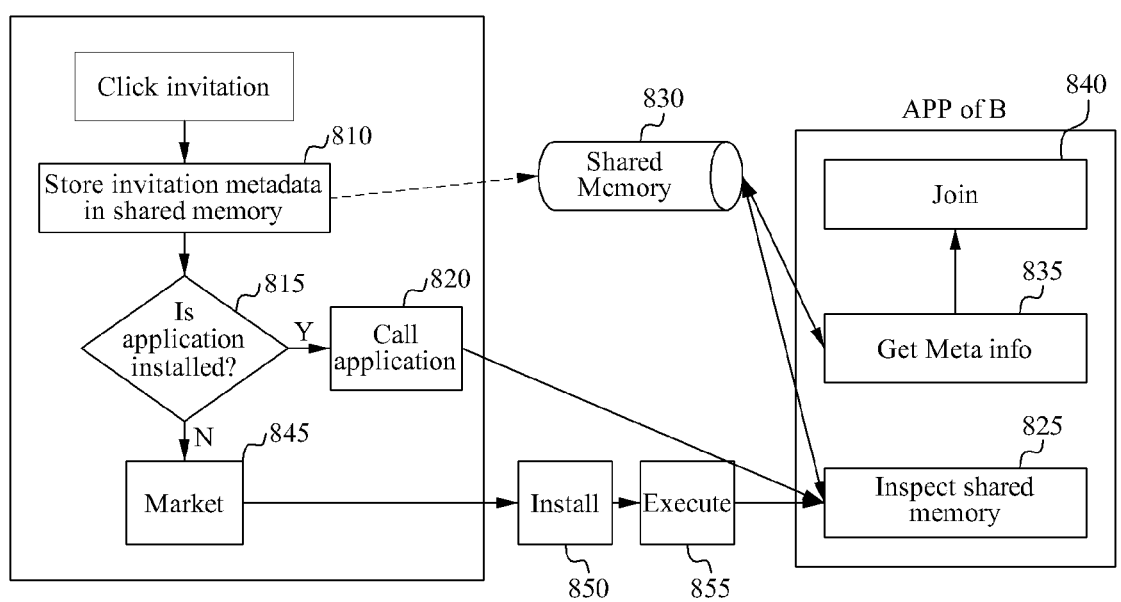
FIG. 8 is a diagram illustrating a method of enabling another user to join an invited space using information stored in a shared memory in response to a invitation from a user according to a method of providing an instant messaging service and multiple services expanded from the instant messaging service according to an exemplary embodiment of the present invention.

FIG. 8 is a diagram illustrating a method of enabling another user to join an invited space using information stored in a shared memory in response to invitation of a user according to a method of providing an instant messaging service and multiple services expanded from the instant messaging service according to an exemplary embodiment of the present invention.

Referring to FIG. 8, after the user Y clicks the invitation in operation 725 of FIG. 7, the providing apparatus may store, in a shared storage, metadata generated by an inviter, in this case, the user X, for example, information associated with the chat room such as an ID of the chat room, and may utilize the metadata. The shared storage may include, for example, a shared memory.

After the user Y clicks the invitation received from the user X through the chat window B for the chat room, the providing apparatus may store, in a shared storage, for example, a shared memory, metadata generated by the user X, for example, information associated with the chat room such as an ID of the chat room, in operation 810.

In operation 815, the providing apparatus may determine whether the application corresponds to the invited space through the invitation, in this case, the game application, is installed in the terminal of the user Y. When the game application is installed in the terminal of the user Y, the providing apparatus may call the game application in operation 820.

The called game application may inspect the shared memory 830 in operation 830, may obtain metadata from the shared memory in operation 835, and may allow the user Y to join the game application space in operation 840.

When the game application is determined to be absent in the terminal of the user Y in operation 815, the user Y may move to the Market in operation 845, may select and install a game application in operation 850, and may execute the game application in operation 855. The invitation received by the user Y from the user X may include an identifier for instructing execution of the application and an identifier for instructing download of the application, and the user may execute or download the application using the identifier.

Operations 825 through 840 may be performed on the game application running in the terminal of the user Y.

Figure 9:
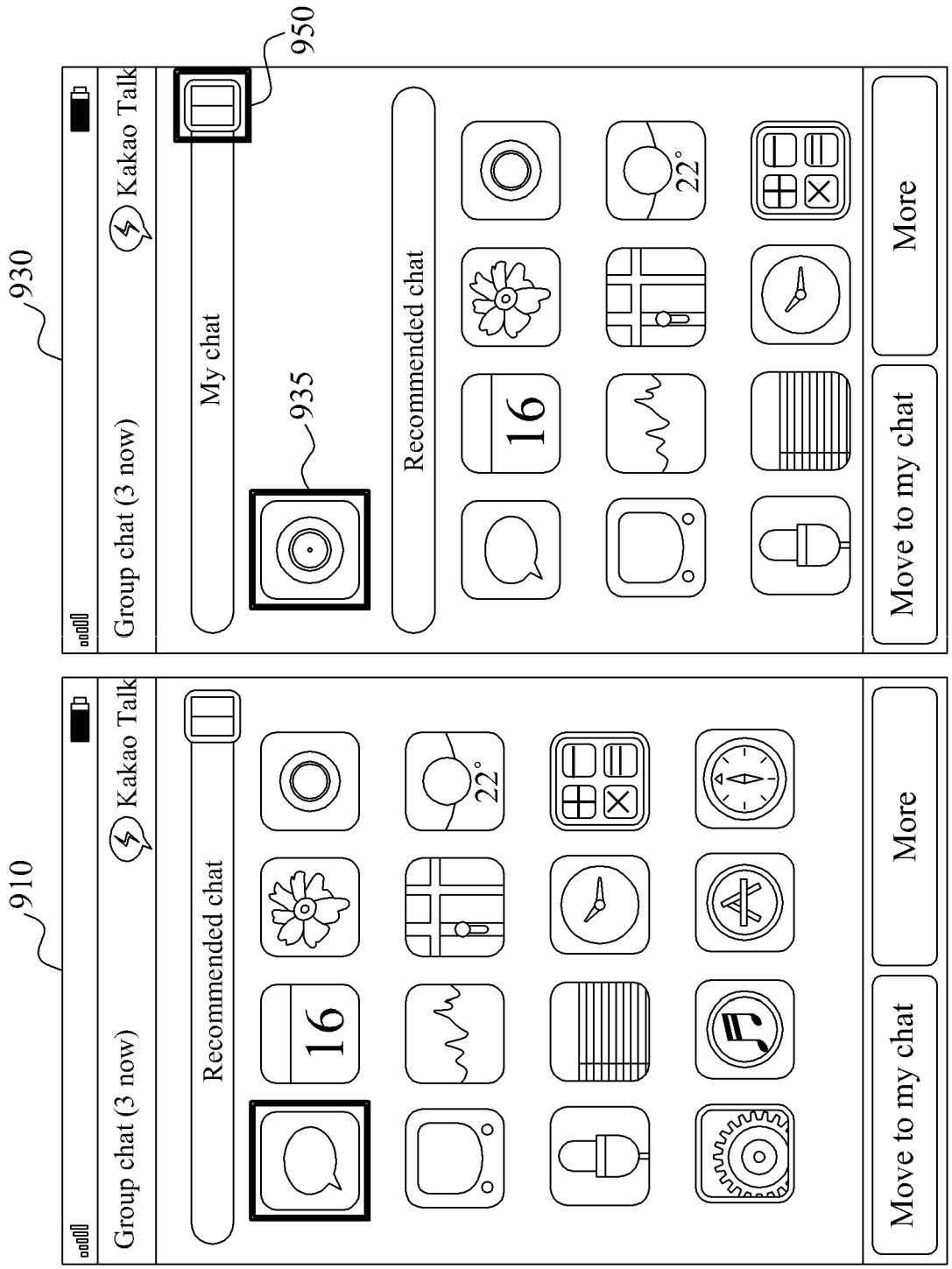
FIG. 9 is a diagram illustrating a window providing an icon corresponding to an application installed in a mobile terminal and icons corresponding to multiple services expanded from an instant messaging service according to an exemplary embodiment of the present invention.

FIG. 9 is a diagram illustrating a window providing an icon corresponding to an application installed in a mobile terminal and icons corresponding to multiple services expanded from an instant messaging service according to an exemplary embodiment of the present invention.

Referring to FIG. 9, a window 910 providing a plurality of services expanded from an instant messaging service according to an exemplary embodiment of the present invention may display icons of applications corresponding to the plurality of services, for example, a game application, a radio application, a photo to cartoon conversion application, and the like. The icons on the window 910 may represent the plurality of services expanded from the instant messaging service, and the icons may be displayed irrespective of whether the applications corresponding to the icons are installed in a user terminal.

An icon corresponding to an application installed or being run in the user terminal, for example, an icon 935 on a window 930 may be displayed in a distinguishable form from icons corresponding to absent applications.

At the right top of the window providing the plurality of services expanded from the instant messaging service according to an exemplary embodiment of the present invention, a button 950 for moving to a chat room related to the instant messaging service may be displayed. While the user is provided with the plurality of services expanded from the instant messaging service, the user may revert to the chat room providing the instant messaging service with a click or a swipe.

Figure 10:
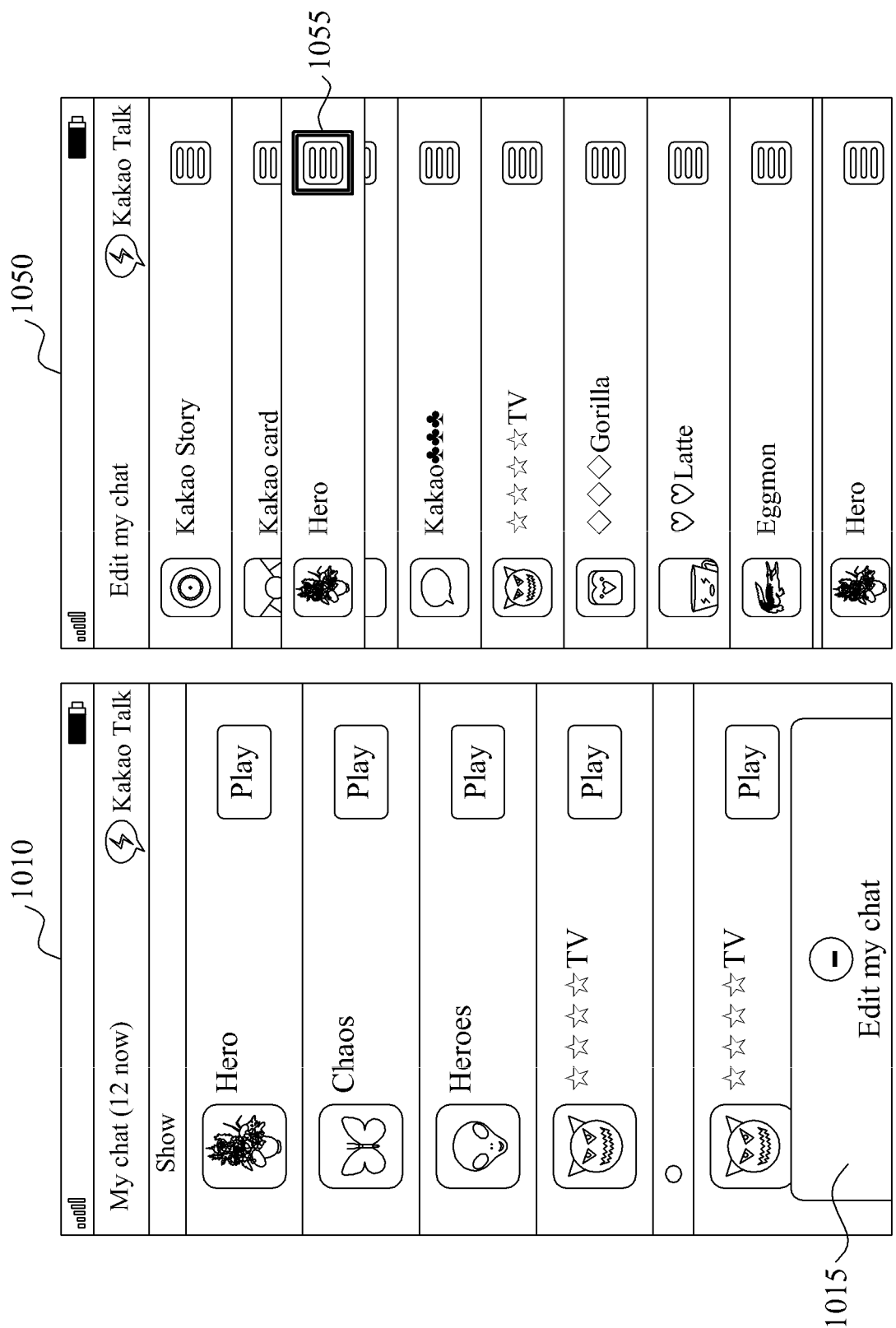
FIG. 10 is a diagram illustrating a method of editing an order of an arrangement of icons corresponding to multiple services expanded from an instant messaging service according to an exemplary embodiment of the present invention.

FIG. 10 is a diagram illustrating a method of editing an order of arrangement of icons corresponding to multiple services expanded from an instant messaging service according to an exemplary embodiment of the present invention.

Referring to FIG. 10, a providing apparatus according to an exemplary embodiment of the present invention may edit icons of applications corresponding to a plurality of services being displayed or an order of arrangement of icons corresponding to applications installed in a user terminal, in response to a touch event input by a user.

For example, when the user selects a button 1015 at the bottom of a window 1010, a window 1050 for editing an order of arrangement of icons corresponding to applications may be provided.

At the right side of each icon on a window 1050, an edit button 1055 may be provided, and when the user moves the edit button 1055 vertically while pressing the edit button 1055, the icon arrangement order may be changed or edited.

Figure 11:
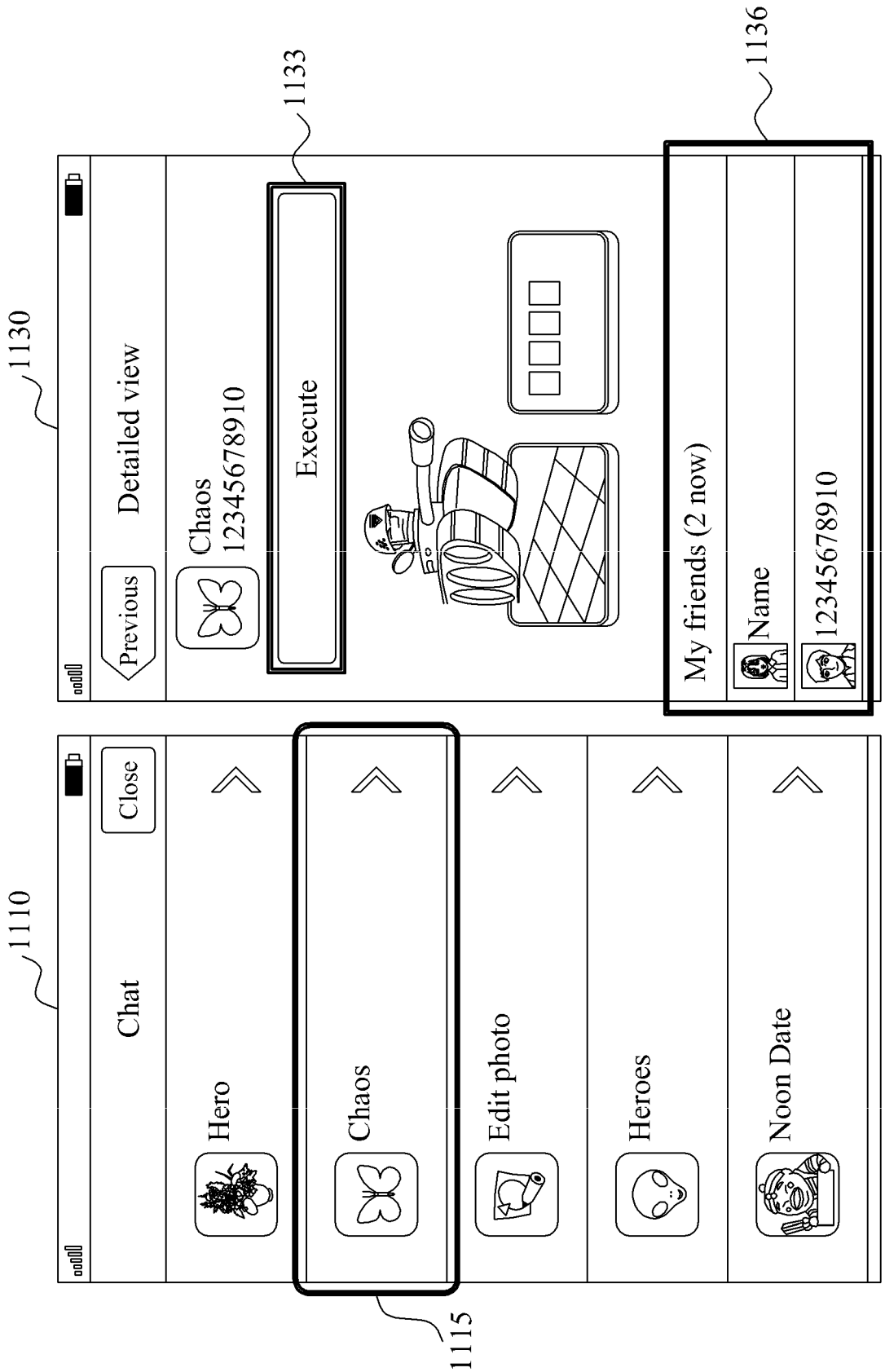
FIG. 11 is a diagram illustrating a window for execution of an application through a detailed view window among applications corresponding to multiple services expanded from an instant messaging service according to an exemplary embodiment of the present invention.

FIG. 11 is a diagram illustrating a window for executing an application through a detailed view window among applications corresponding to multiple services expanded from an instant messaging service according to an exemplary embodiment of the present invention.

Referring to FIG. 11, applications installed in a user terminal may be displayed on a window 1110 among applications corresponding to a plurality of services expanded from an instant messaging service.

When an icon of an application 1115, for example, is selected, a detailed view window 1130 corresponding to the application 1115 may be displayed on the user terminal. The detailed view window 1130 may display a list 1136 of users executing the application or being registered in the application.

The application 1115 may be executed with a touch of an execution button 1133 on the detailed view window 1130.

Figure 12:
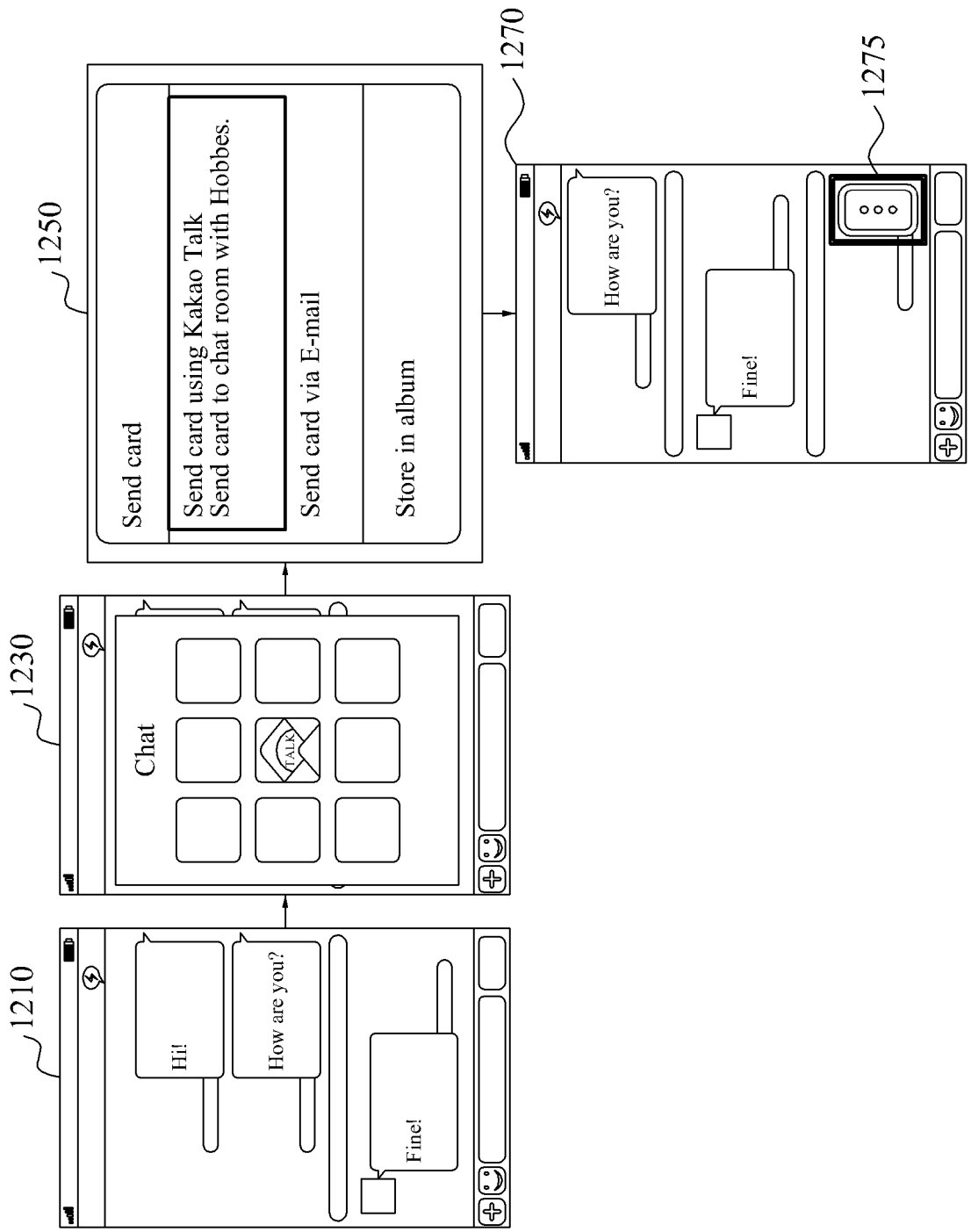
FIG. 12 is a diagram illustrating a method of providing multiple services expanded from an instant messaging service when a corresponding application is installed in a user terminal, according to an exemplary embodiment of the present invention.

FIG. 12 is a diagram illustrating a method of providing multiple services expanded from an instant messaging service when a corresponding application is installed in a user terminal, according to an exemplary embodiment of the present invention.

Referring to FIG. 12, according to an exemplary embodiment of the present invention, the user may be provided with a plurality of services expanded from an instant messaging service through a chat window 1210 for a chat room related to the instant messaging service.

The user may enter a service window 1230 providing a plurality of services corresponding to the chat room by touching, paging, or flicking a touch display of the chat window 1210.

When the user selects one icon among icons displayed on the window 1230, an application corresponding to the selected icon may be executed.

For example, in a case in which the selected application on the window 1230 is a card transmission application, when the card transmission application is executed, a prepared card may be transmitted to the chat room between the user and another user, and before the card is transmitted, the card may be provided to the user in a form of a transmission type selection window 1250. When pre-acquired information associated with the chat room is present, a providing apparatus may provide notification that the prepared card may be transmitted to the corresponding chat room directly.

When the user selects "send a card" in the window 1250, "send a card" may be displayed on a terminal of the user and a terminal of another user, and the user and another user may move to a chat window 1270 for the chat room and may check a message 1275. The message 1275 may correspond to a card transmission notification message or a card reception notification message.

Figure 13A:
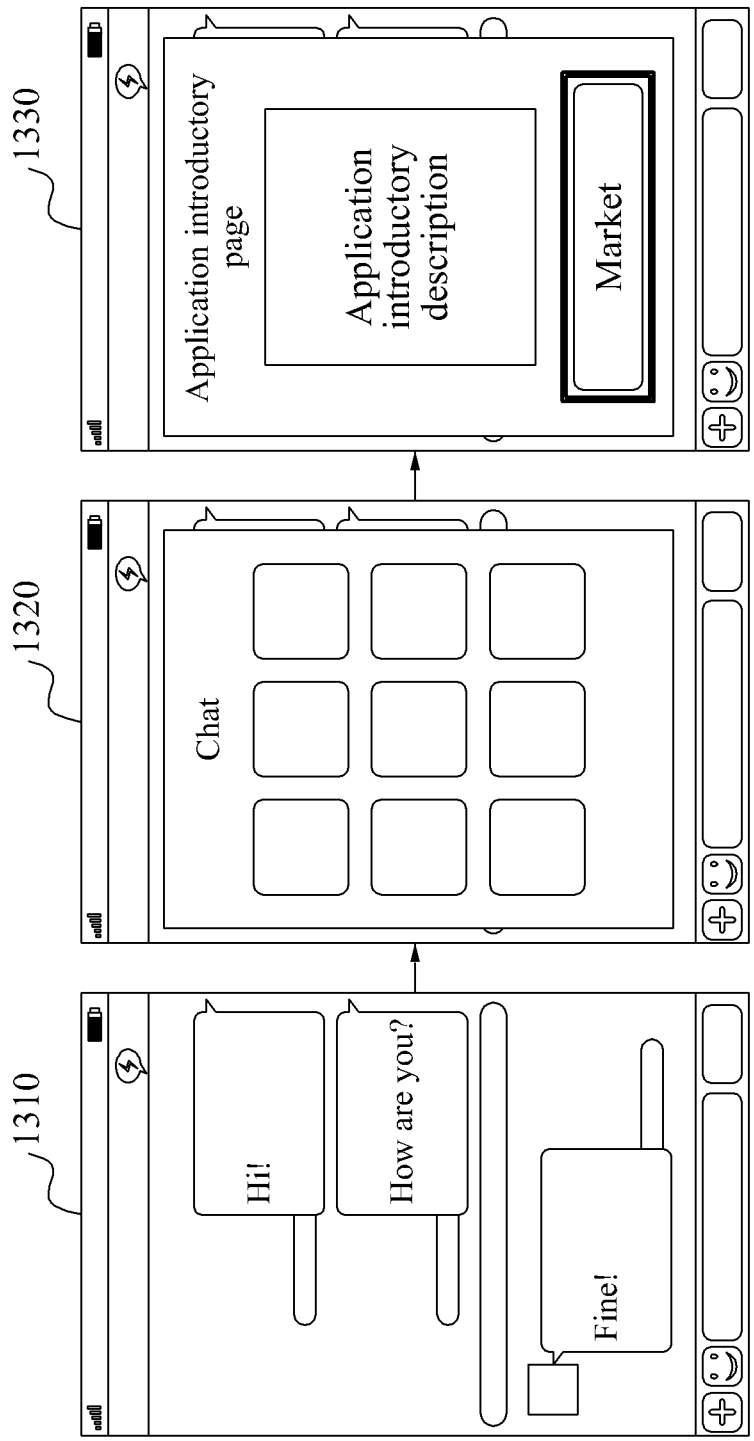
FIGS. 13A and 13B are diagrams illustrating a method of providing multiple services expanded from an instant messaging service when a corresponding application is absent in a user terminal, according to an exemplary embodiment of the present invention.
Figure 13B:
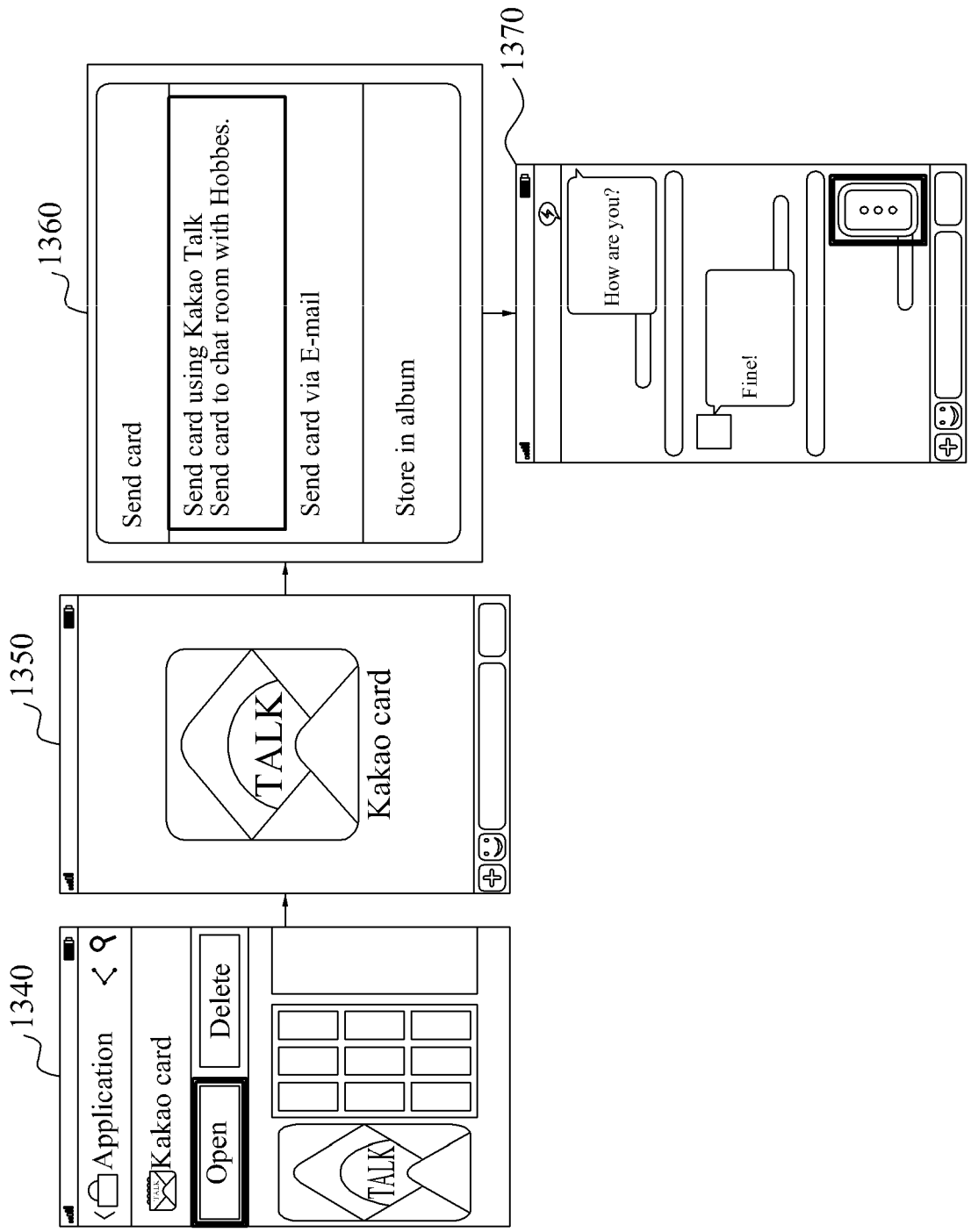

FIGS. 13A and 13B are diagrams illustrating a method of providing multiple services expanded from an instant messaging service when a corresponding application is absent in a user terminal, according to an exemplary embodiment of the present invention.

Referring to FIGS. 13A and 13B, a user may be provided with a plurality of services expanded from an instant messaging service through a chat window 1310 for a chat room related to the instant messaging service.

The user may enter a service window 1320 providing a plurality of services corresponding to the chat room by touching, paging, or flicking a touch display of the chat window 1310.

When the user selects one icon among icons displayed on the window 1320, an application corresponding to the selected icon may be executed. However, when the application corresponding to the selected icon is absent, a window 1330 for introducing the corresponding application may be provided to the user terminal.

When the user touches a Market button in the window 1330 for introducing the corresponding application, a window providing a Market may be displayed on the user terminal, and when the user selects an "install" button, a window 1340 including an "open" button may be displayed on the user terminal.

When the user selects the "open" button in the window 1340, an application selected by the user, for example, a card transmission application 1350 may be executed.

When the application 1350 is executed, a prepared card may be transmitted to a chat room between the user and another user, and before the card is transmitted to the chat room, a transmission type selection window 1360 may be provided to the user.

When the user selects "send a card" in the window 1360, "send a card" may be displayed on the user terminal and a terminal of another user, and the user and another user may move to a chat window 1370 for the chat room and may check a message.

Figure 14:
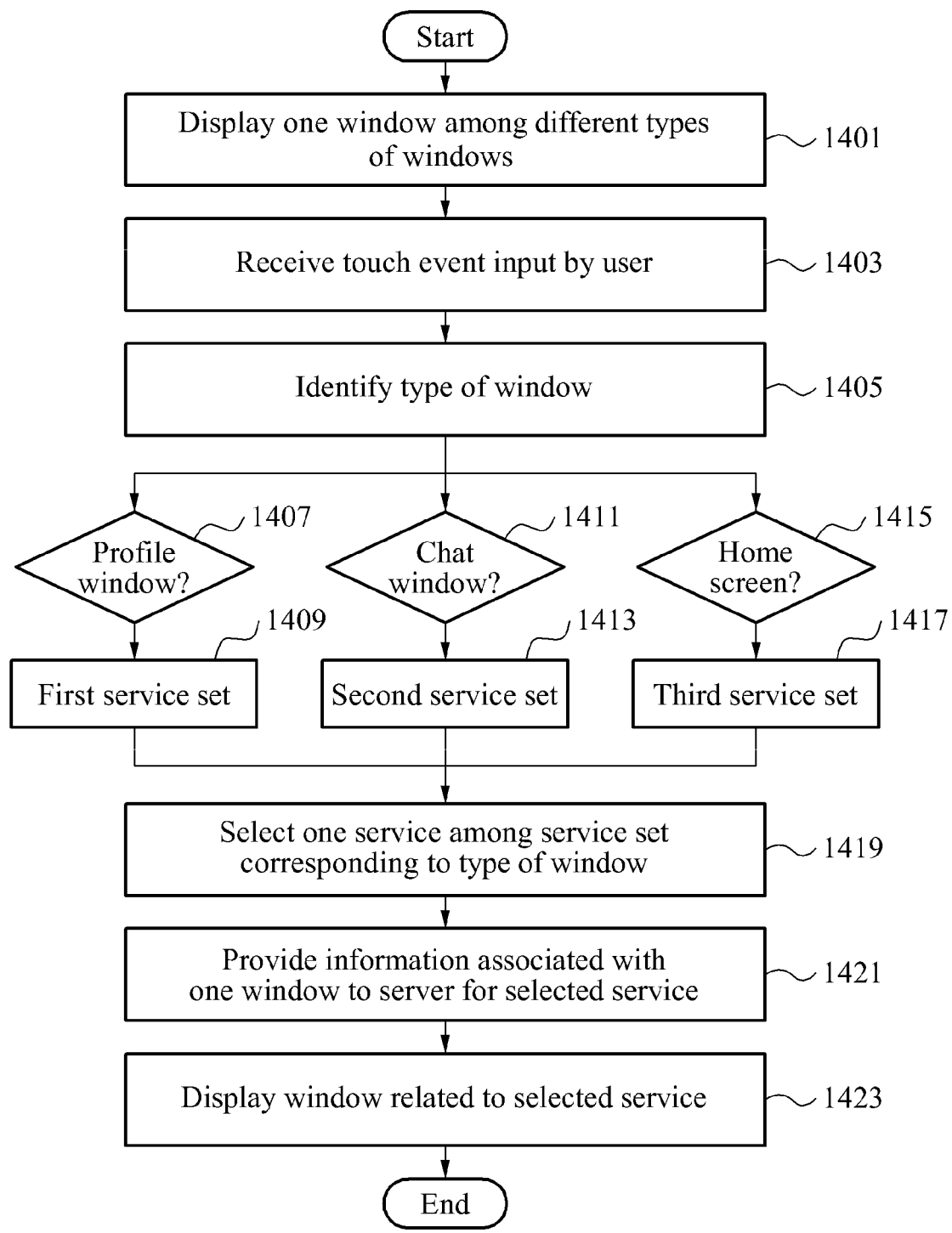
FIG. 14 is a flowchart illustrating a method of providing an instant messaging service and multiple services expanded from the instant messaging service according to still another exemplary embodiment of the present invention.
Figure 15:
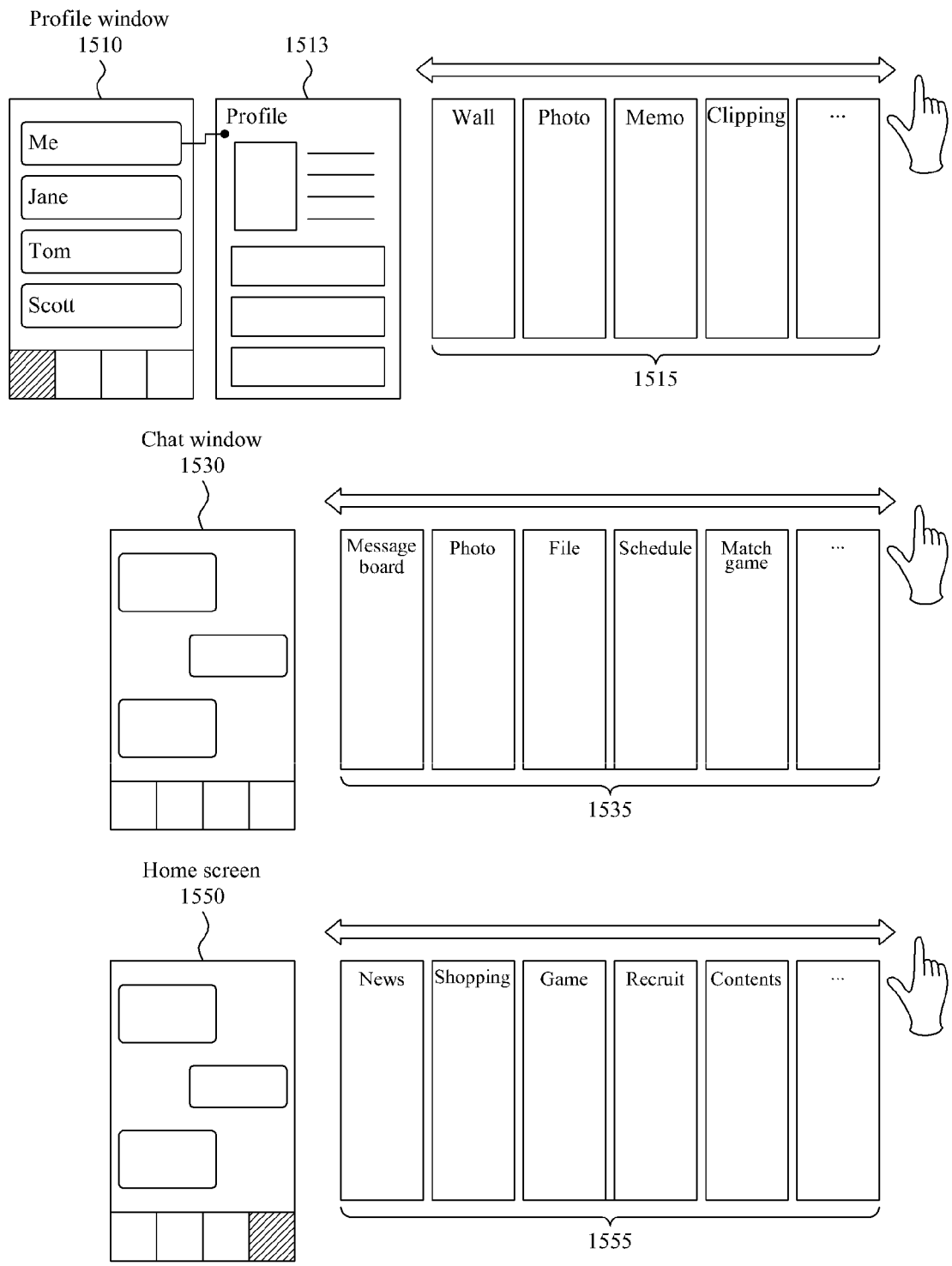
FIG. 15 is a diagram illustrating different types of windows related to an instant messaging service according to an exemplary embodiment of the present invention.

FIG. 14 is a flowchart illustrating a method of providing an instant messaging service and multiple services expanded from the instant messaging service according to still another exemplary embodiment of the present invention. FIG. 15 is a diagram illustrating different types of windows related to an instant messaging service according to an exemplary embodiment of the present invention.

In operation 1401, a providing apparatus may display one window among different types of windows related to an instant messaging service, and in operation 1403, may receive a touch event input by a user on the window.

In operation 1403, the providing apparatus may identify the type of the window.

The different types of windows may include at least one of a profile window 1510 providing profile information of the user, a chat window 1530 enabling the user to use an instant messaging service, and a home screen 1550 providing a plurality of services expanded from an instant messaging service.

The providing apparatus may determine a service set corresponding to each of the types of the windows.

When the touched window is identified to be the profile window 1510 in operation 1407, the providing apparatus may provide a first service set determined corresponding to the profile window 1510 in operation 1409.

When the first service set is provided by the profile window 1510, a corresponding service may be provided differently to each user, for example, different information or different windows for the corresponding service may be provided to each user. A service provided by flicking a window 1513 displaying profile information of "me" may include information stored by "me" and information stored in relation to "me", for example, a photo, a memo, clipping, and the like. A service provided by flicking a window displaying profile information of "Jane" may include information managed by "Jane", for example, a photo, a memo, clipping, and the like. The providing apparatus may provide different information or different windows based on the window which the user is viewing currently.

The providing apparatus may provide a wall paper service, a photo service, and a file sharing service for "me", and may provide a photo service, a memo service, a clipping service, and a single player game service for "Jane". The providing apparatus may acquire information corresponding to the window, and may provide different services to each user using the acquired information.

When the touched window is identified to be the chat window 1530 in operation 1411, the providing apparatus may provide a second service set determined to correspond to the chat window 1530 in operation 1413. The chat window 1530 may correspond to a window for a one-to-one chat room, a group chat room, and a meeting chat room. The providing apparatus may determine a service set based on a type of the chat window, and may provide a service in the determined service set.

The users in each chat room may share photos and files of participants of the corresponding chat room, for example, an online community, through a photo service or a file sharing service.

When the touched window is identified to be the home screen 1550 in operation 1415, the providing apparatus may provide a third service set determined to correspond to the home screen 1550 in operation 1417.

The first service set may include a photo service, a memo service, a clipping service, a wall paper service, and the like, indicated as 1515 of FIG. 15, for information corresponding to the window. The second service set may include a photo providing service, a file providing service, a schedule providing service, a match game providing service, and the like, indicated as 1535, associated with the chat room in which the user belongs. The third service set may include a news providing service, a shopping information providing service, a game providing service, a recruit service, a contents providing service, and the like, indicated as 1555, provided by a management server, or a server for the selected service, that is, a third server.

In operation 1419, the providing apparatus may select one service among the plurality of services, based on the type of the window. The providing apparatus may select one service among the determined service set corresponding to the window, based on the identified type of the window.

In operation 1421, the providing apparatus may provide the information corresponding to the window to the server for the selected service. The information corresponding to the window may include the information associated with the chat room of FIG. 3.

In operation 1423, the providing apparatus may display a window related to the selected service provided by the server for the selected service.

Figure 16:
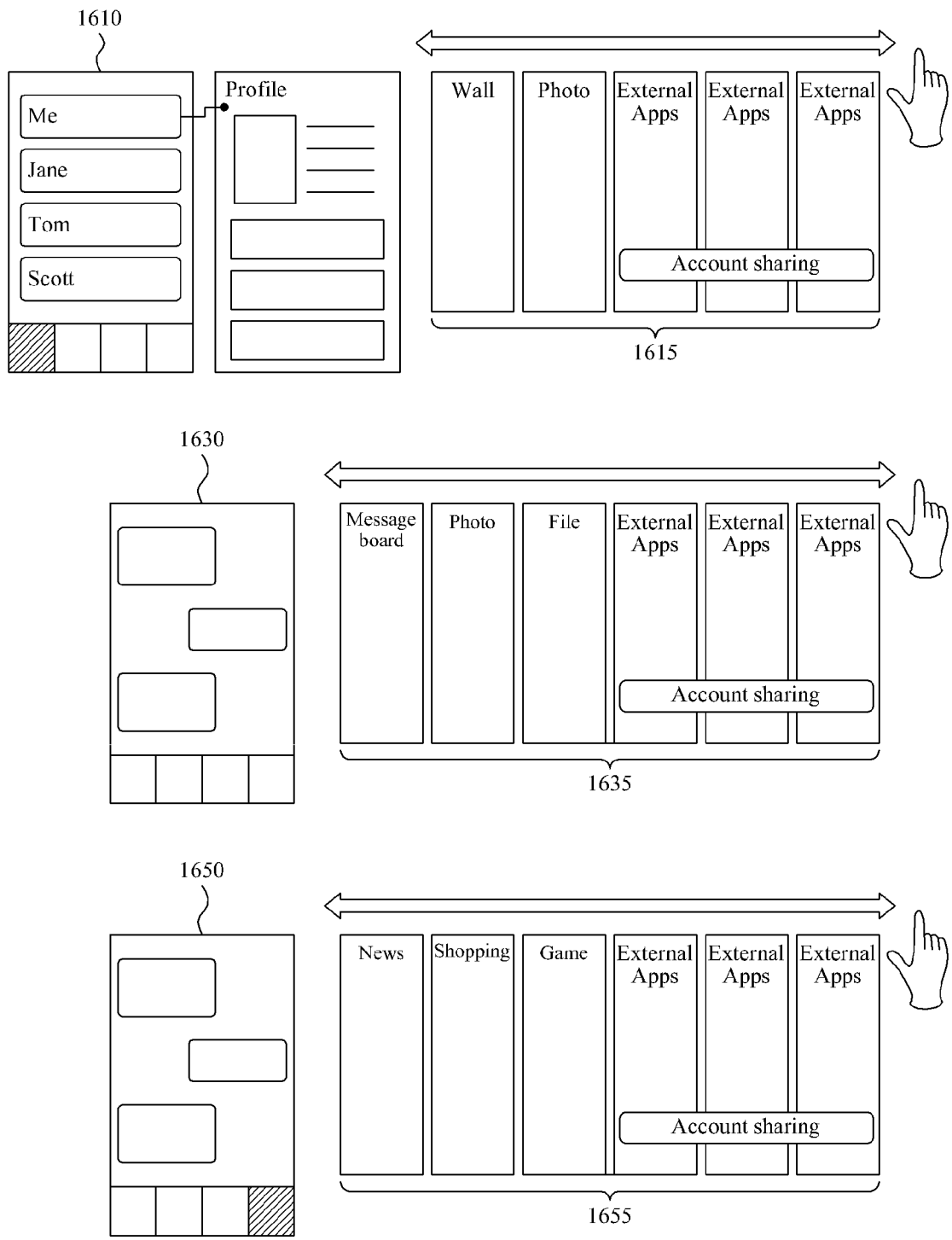
FIG. 16 is a diagram illustrating sharing of account information between an apparatus for providing instant messaging service and multiple services expanded from the instant messaging service according to an exemplary embodiment of the present invention and servers for multiple services expanded from different types of windows.

FIG. 16 is a diagram illustrating sharing of account information between an apparatus for providing instant messaging service and multiple services expanded from the instant messaging service according to an exemplary embodiment of the present invention and servers for multiple services expanded from different types of windows.

Referring to FIG. 16, a plurality of services expanded from different types of windows provided by the providing apparatus may include services managed and provided by the providing apparatus alone, services provided through external third servers, and services selected or invited by a user.

When services are provided through the external third servers, the providing apparatus may share information corresponding to each window with the third servers. For example, information corresponding to a profile window 1610 may include profile information of a corresponding user, for example, Jane, Tom, and the like, including account-related information, for example, an ID, a telephone number, an e-mail address, and the like, and information associated with the user being displayed on the window currently.

Information corresponding to a chat window 1630 may include account-related information for each user registered in a chat room, including an ID, a telephone number, a mail address, a gender, an age, a job, an address, and information associated with participants participating in a chat among users currently registered in the chat room.

Information corresponding to a home screen 1650 may include information associated with users registered in a management server, or a server for the selected service, that is, a third server, and information associated with each of users currently accessing the corresponding server.

The providing apparatus may share, with a third server, information necessary to execute an external application, for example, account information, by the information described in the foregoing.

Accordingly, the user may be provided with various services provided through the window being viewed by the user, directly, absent a need for additional procedures, such as account registration, using only information provided by the user when a service is subscribed to, for example, the instant messaging service.

In this instance, account sharing may be provided to a server for a corresponding service among the services 1615, 1635, and 1655 only when the corresponding service is provided by a third server.

Figure 17:
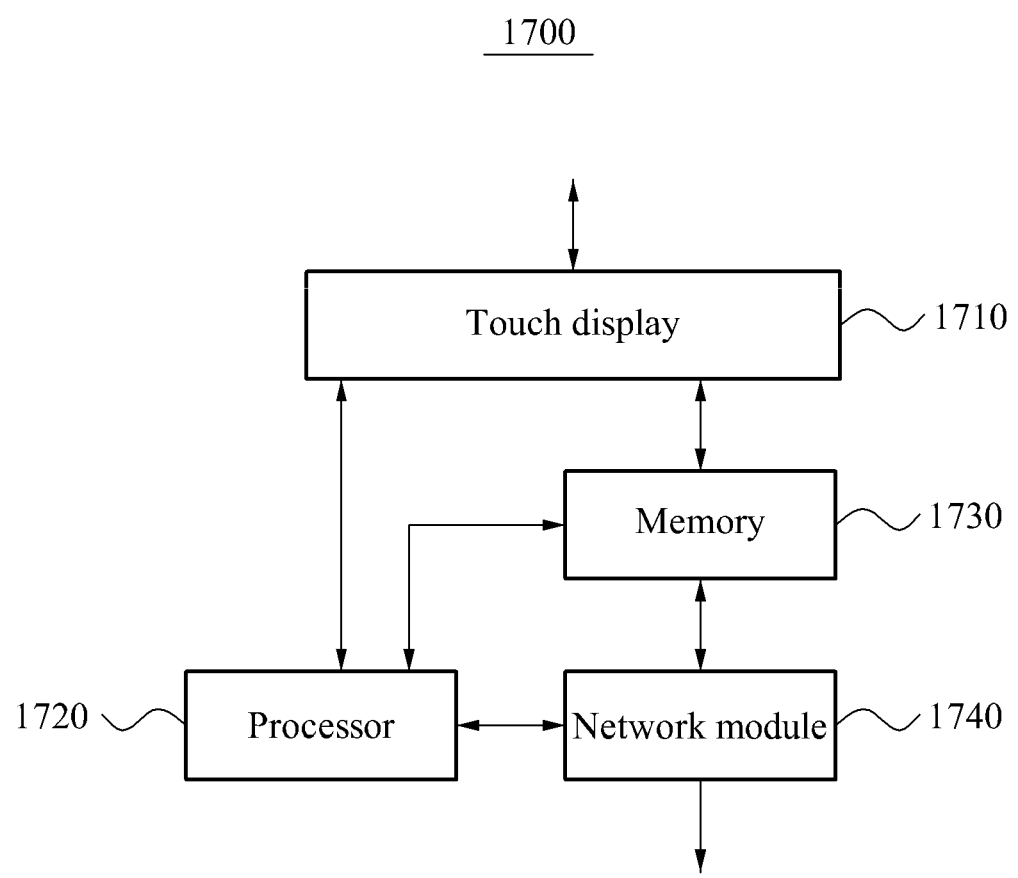
FIG. 17 is a diagram illustrating a structure of a mobile terminal for implementing a method of providing instant messaging service and multiple services expanded from the instant messaging service according to an exemplary embodiment of the present invention.

FIG. 17 is a diagram illustrating a structure of a mobile terminal 1700 for implementing a method of providing instant messaging service and multiple services expanded from the instant messaging service according to an exemplary embodiment of the present invention.

Referring to 17, the mobile terminal 1700 may include a touch display 1710, a processor 1720, a memory 1730, and a network module 1740.

The touch display 1710 may display one window among different types of windows related to an instant messaging service, may display a chat window for a chat room related to the instant messaging service, and may detect a touch event input by a user on the corresponding window.

The processor 1720 may control each component to implement control over an application installed in the mobile terminal to implement the method of providing an instant messaging service and multiple services expanded from the instant messaging service.

The memory 1730 may store the application installed in the mobile terminal to implement the method of providing an instant messaging service and multiple services expanded from the instant messaging service.

The network module 1740 may transmit and receive necessary information to and from a management server or a third server via a wireless Internet or a wireless communication network.

Figure 18:
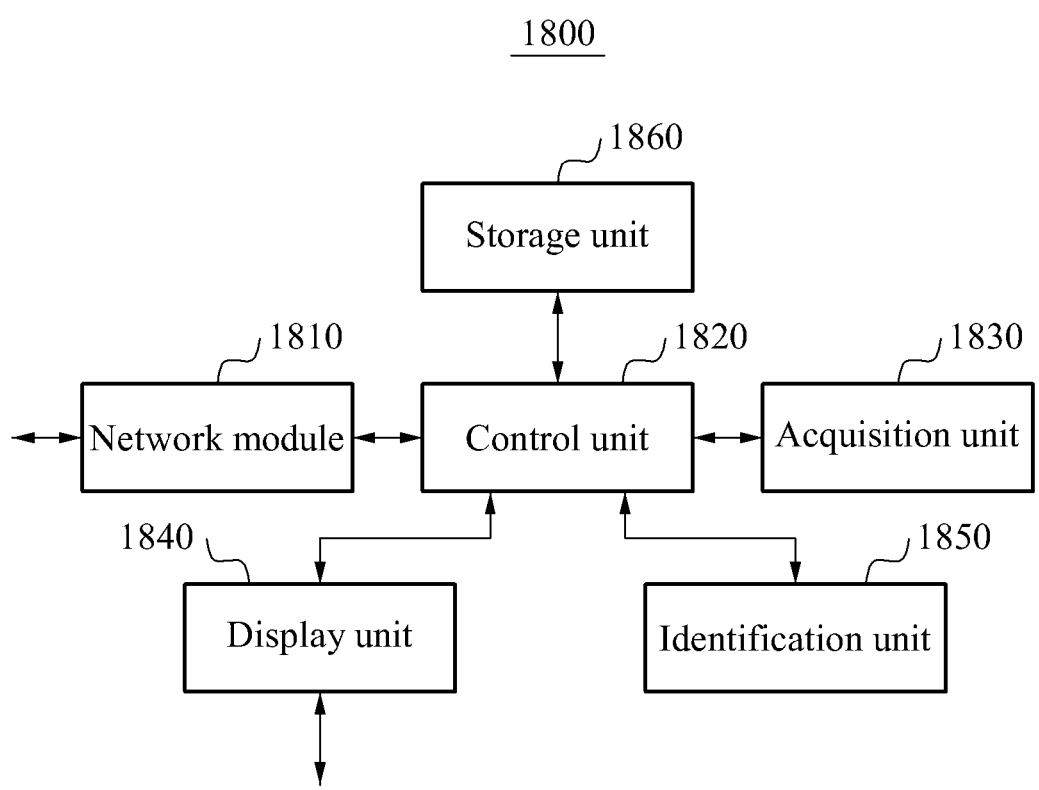
FIG. 18 is a diagram illustrating a structure of a providing apparatus for implementing a method of providing instant messaging service and multiple services expanded from the instant messaging service according to an exemplary embodiment of the present invention.

FIG. 18 is a diagram illustrating a structure of a providing apparatus 1800 for implementing a method of providing instant messaging service and multiple services expanded from the instant messaging service according to an exemplary embodiment of the present invention.

Referring to FIG. 18, the providing apparatus 1800 may include a network module 1810, a control unit 1820, an acquisition unit 1830, a display unit 1840, an identification unit 1850, and a storage unit 1860.

The network module 1810 may transmit and receive necessary information to and from a mobile terminal via a wireless Internet or a wireless communication network. For example, the network module 1810 may detect a touch event input by a user on a chat window for a chat room related to an instant messaging service, and may provide the detected touch event to the control unit 1820.

The control unit 1820 may select one service among a plurality of services in response to the touch event, and may provide information associated with the chat room to a server for the selected service, for example, a third server. The control unit 1820 may receive the touch event input by the user on the chat window.

The acquisition unit 1830 may acquire the information associated with the chat room.

The display unit 1840 may display a window related to the selected service. The display unit 1840 may display the window related to the selected service being provided by an application corresponding to the service provided or selected by the third server.

The identification unit 1850 may identify the plurality of services corresponding to the chat room based on the information associated with the chat room.

The storage unit 1860 may store the information associated with the chat room.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope to of which is defined by the claims and their equivalents.

The invention claimed is:

1. A method of providing an instant messaging service, the method comprising:
providing a plurality of services being different from the instant messaging service in an instant messaging application installed in a terminal of a first user;
identifying a service selected by the first user among the plurality of services;
transmitting an invitation for the selected service to a terminal of a second user;
wherein the invitation includes information for instructing an application corresponding to the selected service to be executed in the terminal of the second user and information for instructing the application corresponding to the selected service to be downloaded in the terminal of the second user.

2. The method of claim 1, further comprising:
executing, by the terminal of the second user, the application corresponding to the selected service when the application is installed in the terminal of the second user; and
downloading the application corresponding to the selected service when the application is not installed in the terminal of the second user.

3. The method of claim 1, wherein the invitation is transmitted through a chat room that the first user and the second user join.

4. The method of claim 1, wherein the second user is registered in a chat room that the first user joins.

5. The method of claim 1, when the first user and the second user are joining a chat room, wherein the application corresponding to the selected service is determined based on information of the chat room.

6. The method of claim 5, wherein the information of the chat room includes at least one of account-related information on each user joining the chat room, or information on a number of users joining the chat room.

7. The method of claim 1, wherein the terminal of the first user and the terminal of the second user perform the selected application together, after the invitation is transmitted to the terminal of the second user.

8. A method of providing an instant messaging service, the method comprising:
identifying information associated with a chat room in an instant messaging service installed in a terminal of a user;
providing a plurality of services different from the instant messaging service based on information associated with the chat room;
selecting a service by the user among the plurality of services;
determining whether an application corresponding to the selected service is installed in the terminal of the user;
in response to determining that the application corresponding to the selected service is installed in the terminal of the user, executing the application in the terminal of the user; and
in response to determining that the application corresponding to the selected service is not installed in the terminal of the user, providing a window to install the application in the terminal of the user.

9. The method of claim 8, wherein the information of the chat room includes at least one of account-related information on each user joining the chat room, or information on a number of users joining the chat room.

10. The method of claim 8, wherein the information of the chat room is determined based on a number of users joining the chat room.

11. The method of claim 8, wherein the user joins the chat room.

12. The method of claim 8, wherein a plurality of other users registered in the chat room join a space of the application according to the service selected by the user.

13. A method of providing an instant messaging service, the method comprising:
   displaying a chat window related to the instant messaging service in an instant messaging application installed in a terminal of a user; and
   displaying an indication of applications corresponding to a plurality of services different from the instant messaging service,
   wherein the indication of applications is displayed irrespective of whether the applications corresponding to the indication are installed in the terminal of the user,
   wherein the indication of absent applications is displayed in a distinguishable form from the indication of installed applications,
   wherein when the indication of an absent application is selected, a window is provided to install the absent application.

14. The method of claim 13, further comprising:
   in response to selecting the indication of an installed application, executing the installed application in the terminal of the user; and
   in response to selecting the indication of the absent application, downloading and installing the absent application in the terminal of the user via the window.

15. The method of claim 8, further comprising:
   displaying an indication of applications that are not installed in the terminal of the user in a distinguishable form from an indication of applications that are installed in the terminal of the user.

* * * * *